United States Patent
Dill et al.

(10) Patent No.: US 12,217,615 B2
(45) Date of Patent: Feb. 4, 2025

(54) ASSURED GEO-CONTAINMENT AND CONFORMANCE ENFORCEMENT SYSTEM FOR AIR, GROUND, AND MARINE VEHICLES

(71) Applicant: UNITED STATES OF AMERICA AS REPRESENTED BY THE ADMINISTRATOR OF NASA, Washington, DC (US)

(72) Inventors: Evan T. Dill, Poquoson, VA (US); Kyle M. Smalling, Newport News, VA (US); Steven D. Young, Poquoson, VA (US); Cuong C. Quach, Hampton, VA (US); Kelly J. Hayhurst, Seaford, VA (US); Anthony J. Narkawicz, Yorktown, VA (US); Russell V. Gilabert, Lewis Center, OH (US)

(73) Assignee: UNITED STATES OF AMERICA AS REPRESENTED BY THE ADMINISTRATOR OF NASA, Washington, DC (US)

( * ) Notice: Subject to any disclaimer, the term of this patent is extended or adjusted under 35 U.S.C. 154(b) by 453 days.

(21) Appl. No.: 17/865,980

(22) Filed: Jul. 15, 2022

(65) Prior Publication Data

US 2022/0366798 A1 Nov. 17, 2022

Related U.S. Application Data

(63) Continuation-in-part of application No. 16/431,066, filed on Jun. 4, 2019, now abandoned, which is a
(Continued)

(51) Int. Cl.
 *G08G 5/00* (2006.01)

(52) U.S. Cl.
 CPC .......... *G08G 5/0069* (2013.01); *G08G 5/006* (2013.01)

(58) Field of Classification Search
 CPC .... G08G 5/0069; G08G 5/006; G08G 5/0013; G08G 5/0021; G08G 5/0039; G08G 5/0052; G05D 1/101; G05D 1/0214
 See application file for complete search history.

(56) References Cited

U.S. PATENT DOCUMENTS

| 8,380,425 B2 * | 2/2013 | Duggan | G08G 5/0069 |
| | | | 340/963 |
| 8,494,693 B2 * | 7/2013 | Murphy | G01C 23/00 |
| | | | 701/16 |

(Continued)

FOREIGN PATENT DOCUMENTS

| EP | 1764628 A2 | 3/2007 | |
| WO | WO-2016154948 A1 * | 10/2016 | ........... B64C 39/024 |

OTHER PUBLICATIONS

Gilabert et al., "Progress and Test Results for a Reliable Independent On-Board Safety Net for UAS," Proceedings of the 36th Digital Avionics Systems Conference, Sep. 17-21, 2017, St. Petersburg, Florida.

(Continued)

*Primary Examiner* — Redhwan K Mawari
(74) *Attorney, Agent, or Firm* — M. Bruce Harper; Robin W. Edwards; Trenton R. Roche

(57) ABSTRACT

A geo-containment system includes at least one unmanned vehicle and an enforcement system that is onboard the unmanned vehicle and configured to limit travel of the unmanned vehicle based, at least in part, on predefined geospatial operational boundaries. Such boundaries may include a primary boundary and at least one secondary boundary that is spaced apart from the primary boundary a minimum safe distance. The minimum safe distance is (Continued)

determined while the unmanned vehicle is traveling. The minimum safe distance is determined using state information of the unmanned vehicle and/or dynamics of the unmanned vehicle. The state information includes at least position and velocity of the unmanned vehicle. The enforcement system is configured to alter and/or terminate operation of the unmanned vehicle if the unmanned vehicle violates the primary geospatial operational boundary and/or the secondary geospatial boundary. The enforcement system may inter-relate with the unmanned vehicle through an onboard vehicle control system.

20 Claims, 13 Drawing Sheets

Related U.S. Application Data continuation-in-part of application No. 15/386,041, filed on Dec. 21, 2016, now Pat. No. 10,490,088.

(60) Provisional application No. 62/680,086, filed on Jun. 4, 2018, provisional application No. 62/329,234, filed on Apr. 29, 2016, provisional application No. 62/272,742, filed on Dec. 30, 2015.

(56) References Cited

U.S. PATENT DOCUMENTS

| | | | | |
|---|---|---|---|---|
| 8,788,118 B2* | 7/2014 | Matos | G08G 5/0013 | 701/2 |
| 8,818,696 B2* | 8/2014 | Klooster | G08G 5/0039 | 701/120 |
| 8,970,400 B2* | 3/2015 | Verna | H04W 4/14 | 340/945 |
| 9,609,284 B2* | 3/2017 | Urbach | H04N 7/181 | |
| 9,671,791 B1* | 6/2017 | Paczan | G05D 1/0088 | |
| 10,214,234 B2* | 2/2019 | Kim | B62D 5/0466 | |
| 10,384,715 B2* | 8/2019 | Schneider | B60W 60/0053 | |
| 10,457,314 B2* | 10/2019 | Swamidason | B62D 5/005 | |
| 10,556,614 B2* | 2/2020 | Swamidason | B60K 35/10 | |
| 10,800,406 B2 | 10/2020 | Awamori et al. | | |
| 10,860,019 B2* | 12/2020 | Censi | G05D 1/0257 | |
| 10,913,491 B2* | 2/2021 | Lesbirel | B60W 20/00 | |
| 10,946,894 B2* | 3/2021 | Pramod | B62D 5/0487 | |
| 10,960,886 B2* | 3/2021 | Pendleton | B60W 40/04 | |
| 11,014,606 B2* | 5/2021 | Wu | B62D 5/0475 | |
| 11,325,592 B2* | 5/2022 | Wongpiromsarn | B60W 60/0015 | |
| 12,054,204 B2* | 8/2024 | Ramanujam | B62D 5/0481 | |
| 2002/0036574 A1 | 3/2002 | Ishihara | | |
| 2007/0078600 A1* | 4/2007 | Fregene | G05D 1/104 | 701/301 |
| 2009/0254275 A1* | 10/2009 | Xie | G01C 21/005 | 701/469 |
| 2010/0228468 A1* | 9/2010 | D'Angelo | G08G 5/045 | 701/120 |
| 2011/0251800 A1* | 10/2011 | Wilkins | G01S 19/49 | 702/24 |
| 2012/0237028 A1* | 9/2012 | Khazan | G05D 1/0022 | 380/258 |
| 2013/0012231 A1* | 1/2013 | Hall | H04W 4/38 | 455/456.2 |
| 2013/0314502 A1* | 11/2013 | Urbach | G05D 1/104 | 348/46 |
| 2014/0018979 A1* | 1/2014 | Goossen | G08G 5/0034 | 701/3 |
| 2014/0249693 A1* | 9/2014 | Stark | G05D 1/0808 | 701/2 |
| 2014/0274151 A1* | 9/2014 | Pattabiraman | H04B 7/12 | 455/456.3 |
| 2015/0254988 A1* | 9/2015 | Wang | G08G 5/0013 | 701/3 |
| 2015/0260850 A1* | 9/2015 | Deng | G01S 19/17 | 342/357.25 |
| 2016/0030808 A1* | 2/2016 | Uchida | G09B 19/0038 | 482/8 |
| 2016/0189548 A1* | 6/2016 | Thurling | G08G 5/0069 | 701/3 |
| 2016/0290826 A1* | 10/2016 | Brenner | G01C 23/005 | |
| 2016/0291589 A1* | 10/2016 | Ashoori | G05D 1/106 | |
| 2017/0158227 A1* | 6/2017 | Katzourakis | B62D 6/008 | |
| 2018/0144641 A1* | 5/2018 | Wang | G08G 5/0052 | |
| 2019/0299983 A1* | 10/2019 | Shalev-Shwartz | G08G 1/163 | |
| 2021/0101599 A1* | 4/2021 | Pendleton | B60W 60/00272 | |
| 2021/0107566 A1* | 4/2021 | Seegmiller | H04W 4/02 | |
| 2021/0166325 A1* | 6/2021 | Shalev-Shwartz | B60W 60/00276 | |
| 2021/0255635 A1* | 8/2021 | Vora | G06N 3/08 | |
| 2021/0276588 A1* | 9/2021 | Kabzan | B60W 10/04 | |
| 2024/0046363 A1* | 2/2024 | Shalev-Shwartz | G08G 1/166 | |

OTHER PUBLICATIONS

Dill et al., "Safeguard, An Assured Safety Net Technology for UAS," Proceedings of the 35th Digital Avionics Systems Conference, Sep. 25-29, 2016, Sacramento, California.

Hayhurst et al., "Å Case Study for Assured Containment," Proceedings of the 2015 International Conference on Unmanned Aircraft Systems, Jun. 9-12, 2015, Denver, Colorado.

* cited by examiner

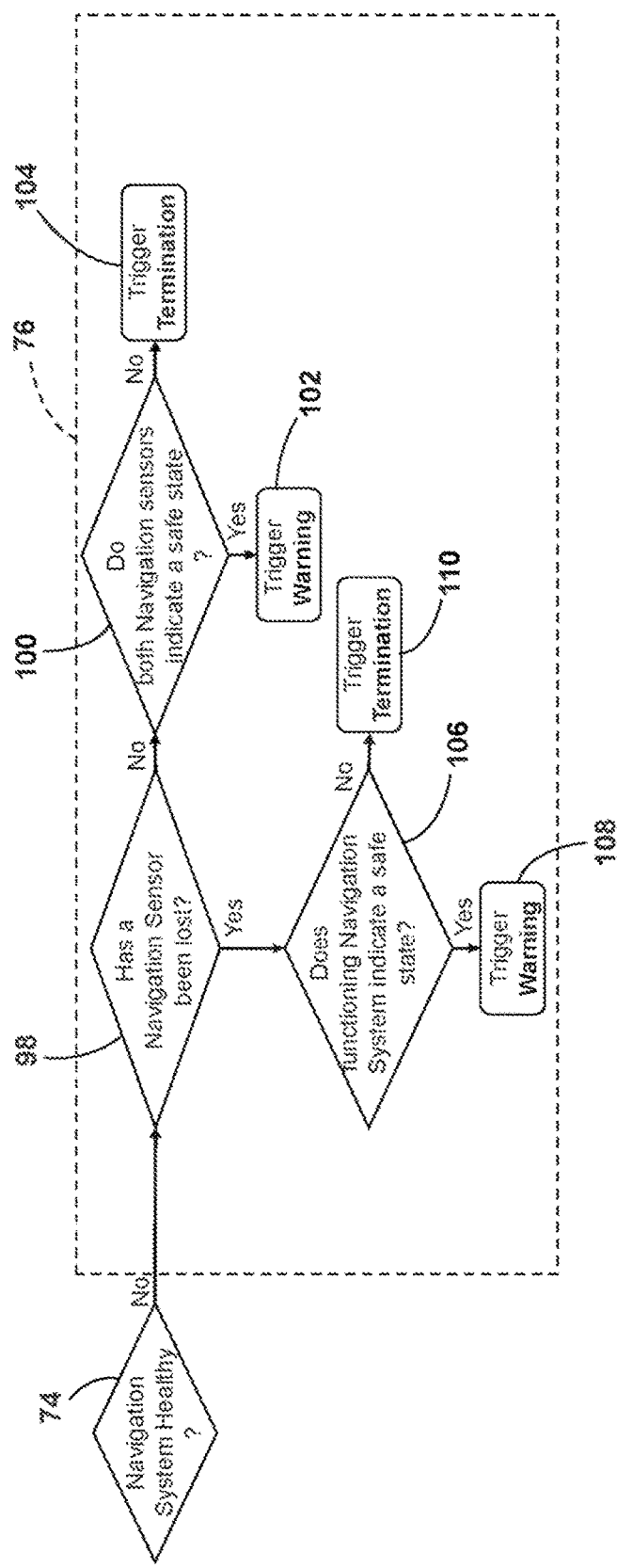
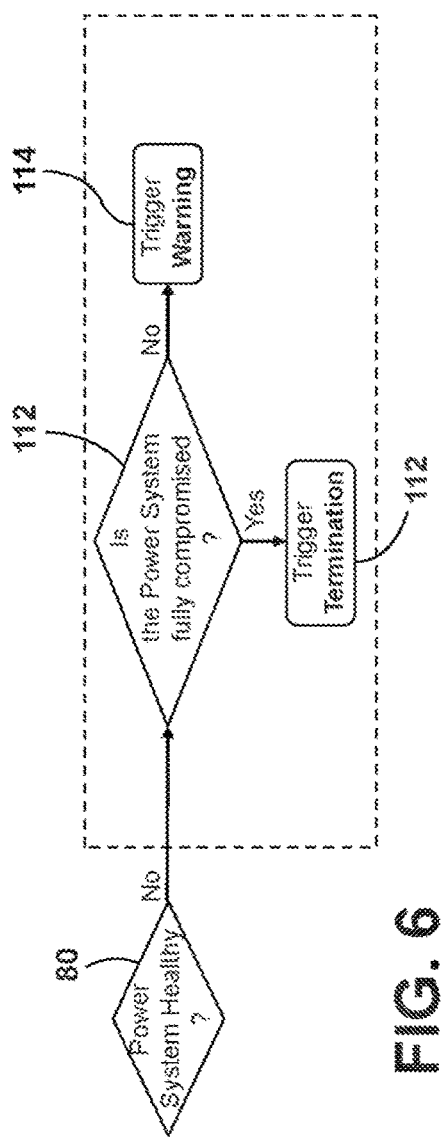
FIG. 5
FIG. 6

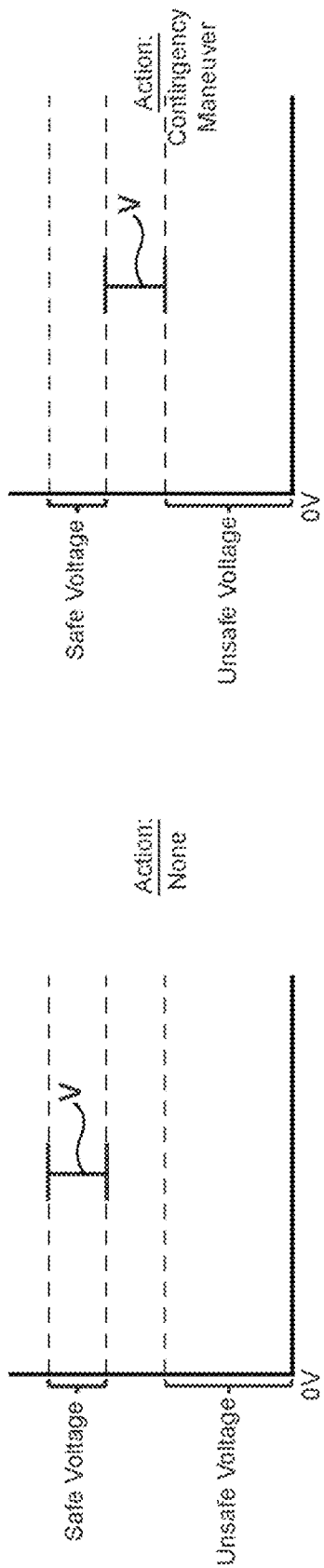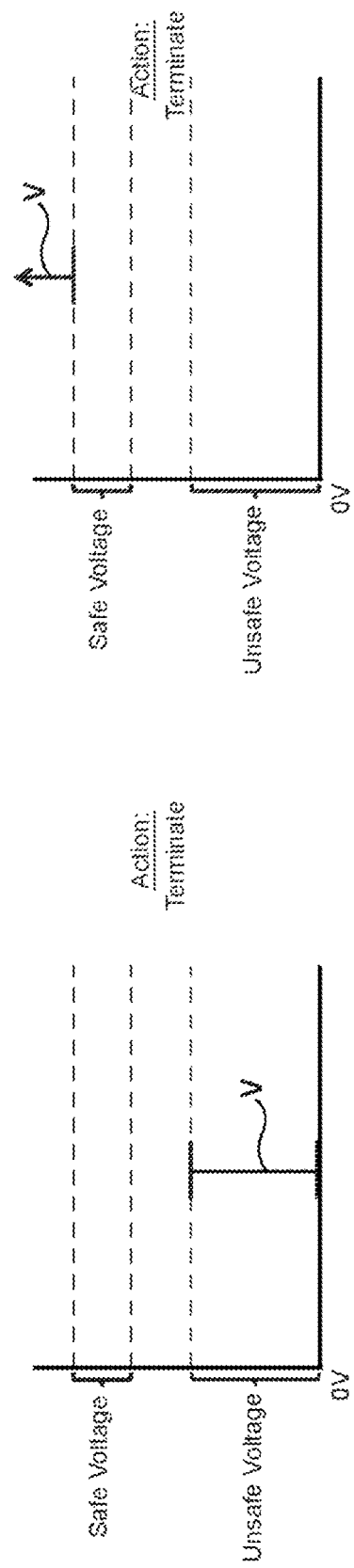

ASSURED GEO-CONTAINMENT AND CONFORMANCE ENFORCEMENT SYSTEM FOR AIR, GROUND, AND MARINE VEHICLES

CROSS-REFERENCE TO RELATED PATENT APPLICATION(S)

This patent application is a continuation-in-part of and thereby claims the benefit of and priority to U.S. patent application Ser. No. 16/431,066, filed on Jun. 4, 2019, which is a continuation-in-part of and thereby claims the benefit of and priority to U.S. patent application Ser. No. 15/386,041, filed on Dec. 21, 2016, which claimed the benefit of and priority to U.S. Provisional Patent Application No. 62/272,742, filed on Dec. 30, 2015, and U.S. Provisional Patent Application No. 62/329,234, filed on Apr. 29, 2016. This patent application also claims the benefit of and priority to U.S. Provisional Patent Application No. 62/680,086, filed on Jun. 4, 2018. The contents of each of the foregoing applications are hereby incorporated by reference in their entirety.

STATEMENT REGARDING FEDERALLY SPONSORED RESEARCH OR DEVELOPMENT

The invention described herein was made in the performance of work under a NASA contract and by employees of the United States Government and is subject to the provisions of the National Aeronautics and Space Act, Public Law 111-314, section 3 (124 Stat. 3330, 51 U.S.C. Chapter 201), and may be manufactured and used by or for the Government for governmental purposes without the payment of any royalties thereon or therefore.

BACKGROUND OF THE INVENTION

Increasingly, vehicular systems no longer require human involvement for operation. Air, ground, and marine vehicles are increasingly capable of self-navigating, to the extent that some passenger vehicles are now capable of driving on roads without any form of human involvement. Also, various types of unmanned aircraft systems have been developed. Such unmanned aircraft systems typically comprise ground-based controllers that communicate wirelessly with unmanned aircraft.

The ability of vehicles to travel without human involvement has introduced significant safety and security concerns. The Federal Aviation Administration has received numerous reports from pilots, aircraft controllers and others about unmanned vehicles operating in areas that can put people on the ground and/or other aircraft in direct harm (e.g., operating where they should not be). Examples include unplanned unmanned aircraft operations near other aviation activities, near firefighting activities, and operation over populated, private, and/or secured areas. Similarly, the availability of self-driving cars has caused numerous crashes, and has raised significant concerns about the use of self-driving cars to transport hazardous materials (e.g., warfare agents) into sensitive areas. Related concerns have been raised in the marine context, as self-navigating marine vehicles could readily cause havoc in, e.g., crowded ports.

Legislation has been proposed to mandate technology, such as geo-fencing, to prevent unmanned vehicles from traveling in certain areas. Geo-fencing systems are available today for some vehicles that provide some functionality to prevent unmanned vehicles (e.g., aircraft) from entering certain areas (e.g., "no-fly" zones). Some geo-fencing system developers have introduced features into unmanned aircraft systems, such as flight planning software within base stations that can assist users in developing and submitting flight plans for FAA approval. In other cases, the systems may include features such as maps, flight planning virtual walls, or warnings that notify a user should a vehicle approach an unapproved flight area or no-fly zone. But existing geo-fencing technology relies extensively on Global Positioning System (GPS) and/or autopilot systems, which are subject to single point failure, and are often easily confused, degraded, overridden, or tricked. Wind, momentum, degradation of wireless communications, or GPS inaccuracies could easily allow a vehicle to drift into or overshoot a virtual wall or inadvertently enter a portion of a no-fly zone. Such existing systems do not enable the enforcement or control over vehicle proximity or geo-containment (i.e., conforming to the acceptable areas) within a known, quantified, and controllable measures of assurance. Thus, existing geo-fencing technology does not meet reliability and integrity needs.

BRIEF SUMMARY OF THE INVENTION

The present disclosure includes a system for a vehicle (e.g., an air vehicle such as aircraft, a marine vehicle such as a ship, and/or a ground vehicles such as a car) to automatically detect established boundaries of a designated geospatial operational area and prevent such vehicles from crossing the boundaries. The system may comprise, e.g., a computing device located in a vehicle. Real-time data about the position of the vehicle may be used to determine the proximity of the vehicle to pre-defined operational boundaries (e.g., horizontal and vertical boundaries) using a system of buffers defined for each boundary. The operational boundaries may be provided, at least in part, in databases with established no-travel zones (e.g., secure military bases, "no-fly" zones). The boundaries may additionally and/or alternatively be provided (e.g., uploaded to a computing device) by an operator. If the positioning data indicates that the vehicle has crossed into a buffer (e.g., crossing a secondary boundary a minimum distance from a primary boundary), the system may send a trigger or signal to an onboard vehicle control system or autopilot system of the vehicle to make a contingency maneuver to avoid crossing the boundary. The contingency maneuver may comprise, for example, causing the vehicle to turn around. If the contingency maneuver fails (e.g., if turning around is not possible) and the vehicle continues through the buffer, the system may automatically activate or trigger a travel termination maneuver prior to breaching the operational boundary. The system may use real-time positioning (that is not solely reliant on autopilot and/or GPS coordinates), in the scheme that is used to detect impending boundary violations. These features may be included in a system architecture that facilitates certification. A system according to the present disclosure may be utilized to provide an assured safety net for practically all unmanned vehicles operations.

An assured geo-containment system according to the present disclosure may provide numerous benefits. The system may be independent of the vehicle and any on-board components, such as any autopilot systems, and may be powered separately from such components. Also, the positioning system need not rely solely on GPS. Rather, a fully GPS-independent positioning source may be used to obtain geo-referenced state data. This may be achieved by use of a primary and alternate positioning, navigation, and timing systems. Furthermore, the boundaries for the no-travel zones may be described with virtually any polygon. Such boundaries may be any shape and in any number. The algorithms (e.g., the criteria) for establishing whether a boundary is valid and for detecting proximity to all defined boundaries are based on rigorous mathematical models that have been formally verified.

A geo-containment system as described herein may include at least one unmanned vehicle. The geo-containment system may operate by inter-relation and communication among positioning, navigation, and timing systems, and onboard assurance enforcement system, and an onboard vehicle control system having a termination system that is configured to limit travel (e.g., motion, flight, sailing, or the like) of a vehicle based, at least in part, on predefined geospatial operational boundaries. A geospatial operational boundary may optionally include a stay-in region and/or one or more stay-out regions. The predefined geospatial operational boundaries include a primary geospatial operational boundary and at least one secondary geospatial operational boundary that is spaced apart by a minimum distance from the primary geospatial operational boundary. The minimum distance may be determined while the unmanned vehicle is traveling and may be based on, among other things, state information of the unmanned vehicle including at least a velocity of the unmanned vehicle, and dynamics information (e.g., a dynamics coefficient) of the unmanned vehicle. The minimum distance or buffer might also represent a measure of containment assurance as a function of a real position of the vehicle and the estimated position. The system may be configured to alter or terminate operation of the unmanned vehicle if the unmanned vehicle violates either the primary geospatial operational boundary or the secondary geospatial boundary. A violation may occur if the unmanned vehicle moves to a position in which the unmanned vehicle is less than a minimum allowable distance or buffer from either the primary geospatial boundary or the secondary geospatial boundary. The minimum allowable distance may include an uncertainty term (e.g., a known or predetermined potential error) with respect to a location of the unmanned vehicle.

The at least one secondary geospatial boundary may include a warning boundary and a soft boundary, wherein the soft boundary is located between the warning boundary and the primary geospatial boundary. The soft boundary may be at the minimum safe distance from the primary geospatial boundary, and the warning boundary may be spaced apart from the primary geospatial operational boundary a distance that is a scale factor, p, multiplied by the minimum safe distance. The scale factor may be 1.25 or other suitable value. The enforcement system may be configured to generate a warning if the unmanned vehicle crosses the warning boundary. The unmanned vehicles may include an auto-pilot system or other suitable control feature that causes the unmanned vehicle to perform a contingency maneuver (e.g., turn the vehicle around, stop the vehicle, land the vehicle, turn off an engine of the vehicle) if a warning signal is generated by the enforcement system. The unmanned vehicle contingency maneuver may include at least one of, but is not limited to, a turn, a reduction in speed, and/or a reduction in altitude (in the case of an unmanned air vehicle).

The geo-containment system (e.g., the unmanned vehicle) may include a first navigation system that is GPS-based, and a second navigation system that is GPS-independent. The first navigation system may provide positional data of the unmanned vehicle during travel within a first error distance, and the second navigation system may provide positional data of the unmanned vehicle during travel within a second error distance. The allowable distance may comprise the greater of the first and second error distances. The second navigation system may comprise virtually any suitable alternative positioning system. The system may be configured to evaluate a travel plan prior to travel of the unmanned vehicle to determine if the travel plan will cause the unmanned vehicle to violate the primary geospatial operational boundary and/or the secondary geospatial boundary.

These and other features, advantages, and objects of the present invention will be further understood and appreciated by those skilled in the art by reference to the following specification, claims, and appended drawings.

BRIEF DESCRIPTION OF THE SEVERAL VIEWS OF THE DRAWINGS

FIG. 5 is a diagram showing operating logic for navigation system monitoring.

FIG. 6 is a diagram showing operating logic for system power monitoring.

FIG. 12A is a graph showing power system evaluation logic for normal operation.

FIG. 12B is a graph showing power system evaluation logic for a low voltage condition.

FIG. 12C is a graph showing power system evaluation logic for a dangerously low or zero voltage condition.

FIG. 12D is a graph showing power system evaluation logic for an excessively high voltage condition.

DETAILED DESCRIPTION OF THE INVENTION

Figure 1:
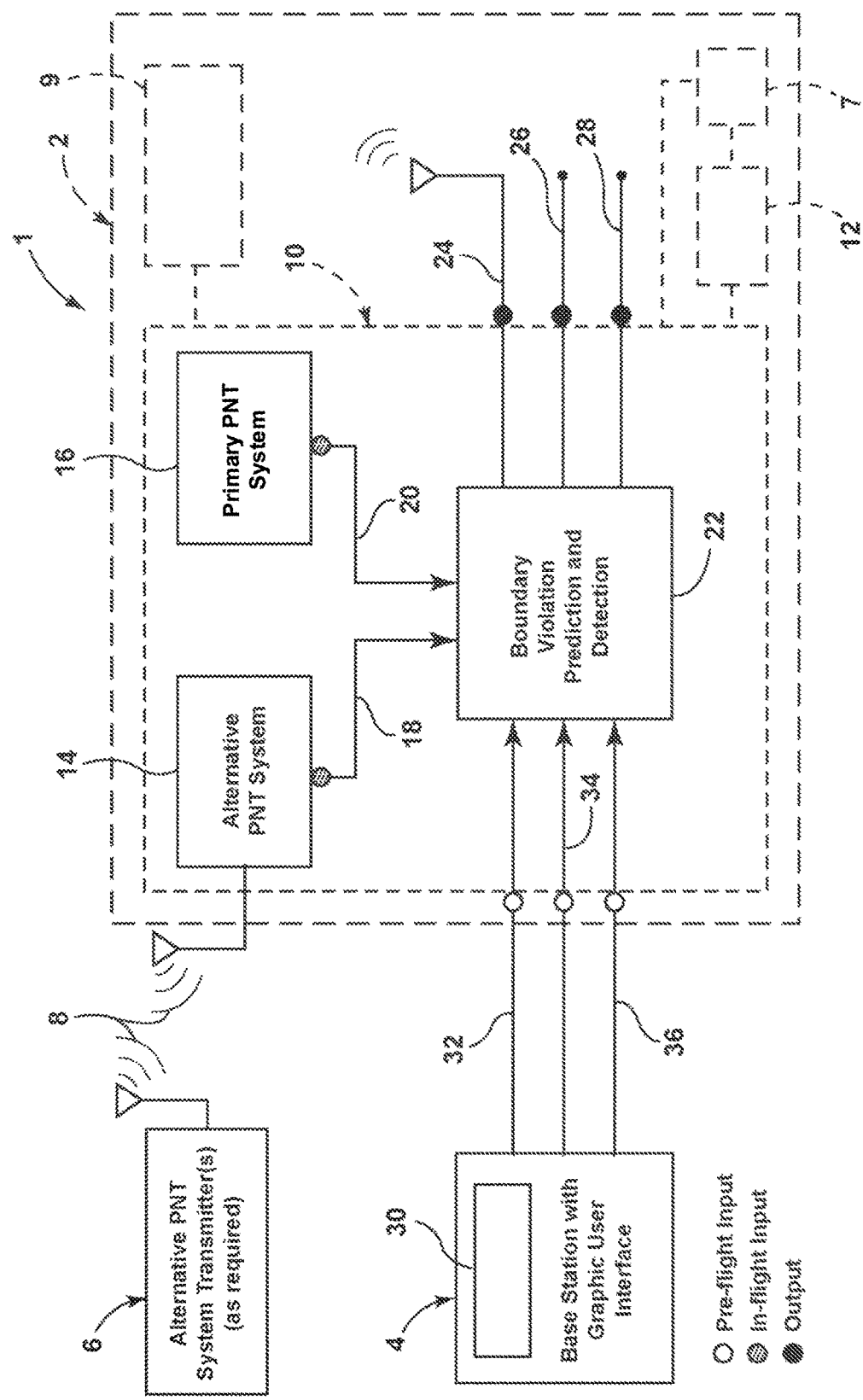
FIG. 1 is a schematic representation of a geo-containment system for unmanned vehicles.

For purposes of description herein, the terms "upper," "lower," "right," "left," "rear," "front," "vertical," "horizontal," and derivatives thereof shall relate to the invention as oriented in FIG. 1. However, it is to be understood that the invention may assume various alternative orientations and step sequences, except where expressly specified by claim to the contrary. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

As a preliminary matter, the unmanned vehicles discussed herein may comprise unmanned ground vehicles (e.g., cars, trucks), unmanned marine vehicles (e.g., boats), and/or unmanned aircraft (e.g., commercial airplanes, helicopters, drones, fixed winged aircraft, rockets). While many examples are described with respect to flight, which presents three dimensions of movement and therefore more complexity in some respects, all examples apply in equal force to ground and/or marine travel, which present in some respects more simplified travel constraints.

The approaches described herein provide a quantifiable or known measure of assurance that an unmanned vehicle will conform to a desired geo-containment scheme. FIG. 1 is a schematic representation of a geo-containment system for unmanned vehicles. An assured geo-containment system 1 for unmanned vehicles may comprise an unmanned vehicle 2 that may be communicably connected to a base station 4. The unmanned vehicle 2 may include an enforcement system 10 that is operably connected to a propulsion system 12 (e.g., an engine, a motor, or the like), typically indirectly through an avionic or onboard control system, as discussed below. Enforcement system 10 itself is a control system that interrelates with other elements of geo-containment system 1 to assure or enforce conformance of vehicle 2 to the applicable geo-containment scheme. The enforcement system 10, F, may have virtually any suitable configuration to properly relate to vehicle 2 for achieving the functionality claimed herein. For example, enforcement system 10 may include a programmable controller component, electrical circuit components, software, and/or the like. The unmanned vehicle 2 may be communicatively coupled with variety of supporting systems for positioning, navigation, and timing (PNT). The geo-containment system 1 may include a primary PNT system 16 (which may, e.g., be a GPS system) and an alternative PNT system 14, which may provide GPS-independent data 18. Primary PNT system 16 and alternative PNT system 14 communicate with a boundary violation prediction and detection component 22, such that it may receive GPS-based position data 20 and GPS-independent data 18. The GPS-independent data 18 and the data from the primary PNT system 16 need not differ in format such that, for example, the two sets of data may differ only in their sources and respective degree of reliability or accuracy. The boundary violation prediction and detection component 22 may comprise its own programmable controller component, processor, executable software, and/or other suitable arrangement. As discussed in more detail below, the boundary violation prediction and detection component 22 may provide an output 24 comprising diagnostic output or a message, a termination output 26, or a warning output 28. Thus, enforcement system 10 in the embodiment shown in FIG. 1 may comprise or interrelate with alternative PNT system 14, primary PNT system 16, and boundary violation prediction and detection component 22. Disposition or location of enforcement system 10 onboard the unmanned vehicle 2 simplifies or enables the integrated use of GPS-independent data 18, as well as simplifying the inter-relation with other components onboard unmanned vehicle 2, such as propulsion system 12. Additionally, onboard positioning of enforcement system 10 enables higher definition and reliability of communication among these components, reducing the risk of degradation or communication errors. In some embodiments, it is contemplated that enforcement system 10 may be portable, such that enforcement system 10 may be loaded onto vehicle 2 for use during operation, and in which case enforcement system 10 may inter-relate with, but not necessarily physically incorporate primary PNT system 16.

The base station 4 may include a graphical user interface 30 or other suitable device/feature that provides graphical and/or text data to a user. Base stations are often used by a pilot or user to define flight paths or to set a range or distance limit a vehicle may travel from the pilot, sometimes as a means to ensure the vehicle remains within sight. See 14 CFR 107.31. In the present case, however, base station 4 may permit a user to input one or more boundary points 32, vehicle dynamics coefficients 34, and data regarding the travel plan 36. These pre-travel inputs may then be evaluated by the onboard boundary violation prediction and detection component 22 before and during travel of unmanned vehicle 2.

Enforcement system 10 may relate to a propulsion system 12 of unmanned vehicle 2 through communication signals or "triggers" that are communicated to an onboard vehicle control system 1306, which causes onboard vehicle control system 1306 to respond, as further discussed below with reference to FIG. 13. The unmanned vehicle 2 may, in some embodiments, also include an auto pilot that is operably connected to the boundary violation prediction and detection component 22 and, similarly, propulsion system 12 that may be operably connected to boundary violation prediction and detection component 22, in each case by signals through onboard vehicle control system 1306. An auto pilot may thus be an element or component of onboard vehicle control system 1306. The unmanned vehicle 2 may also include a power system 9 (e.g., a battery) that may provide electrical power to the various onboard electrical components.

Figure 2:
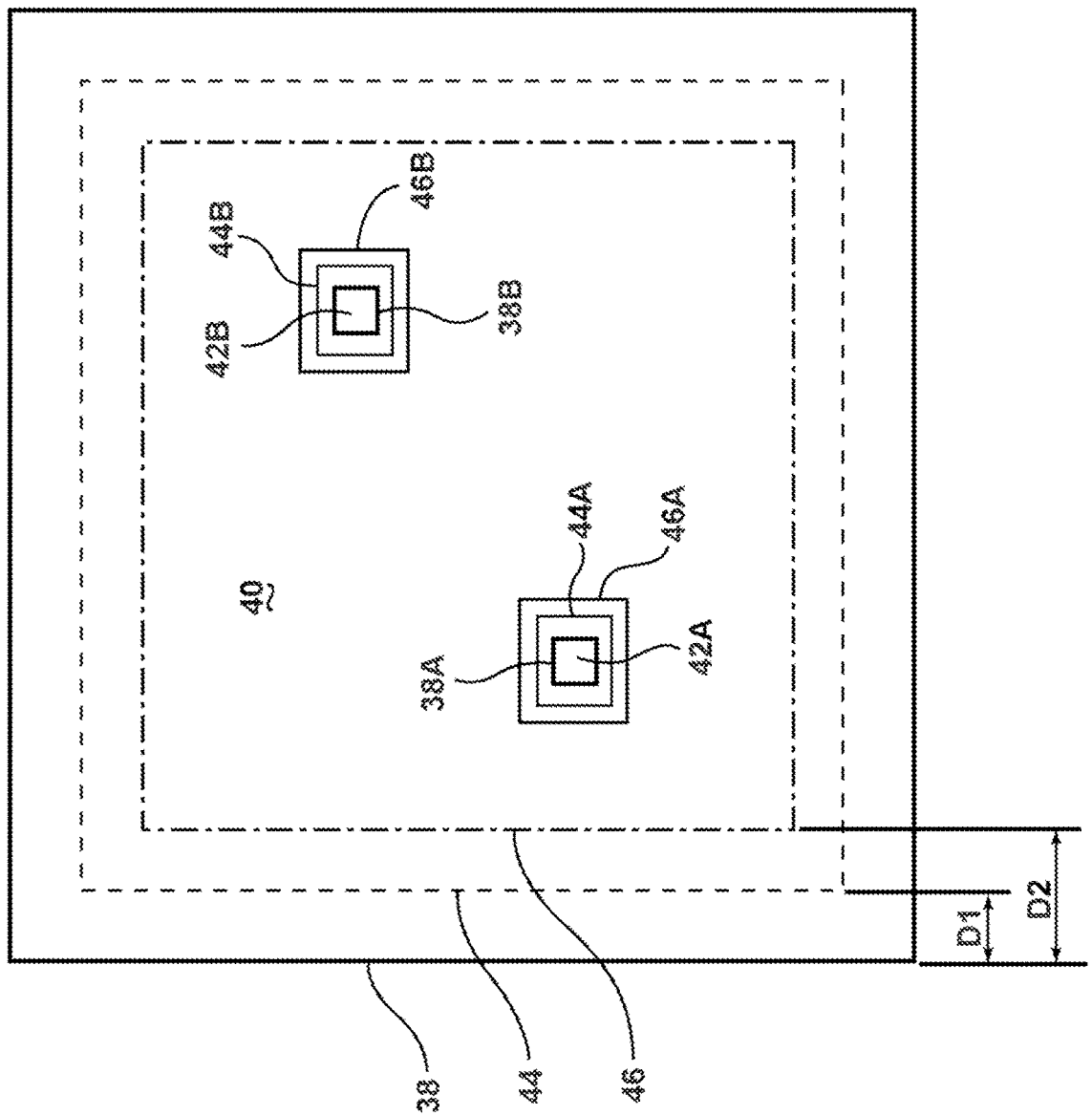
FIG. 2 is a schematic plan view showing boundaries of stay-in regions and stay-out regions.

Enforcement system 10 is that onboard portion of the geo-containment system 1 that is configured to determine safe distances and thereby limit or conform the travel of unmanned vehicle 2 to the geo-containment scheme. For example, FIG. 2 shows boundaries of stay-in regions and stay-out regions. Boundary points may define one or more hard boundaries 38, 38A, 38B, and the like. The hard boundary 38 may form a stay-in region 40. The hard boundary 38A may define a stay-out region 42A, and the hard boundary 38B may define a stay-out region 42B. The hard boundaries 38, 38A, 38B may represent lateral boundaries; however, the geo-containment system 1 may additionally and/or alternatively use one or more boundaries in any direction desired (e.g., vertical boundaries). The boundary violation prediction and detection component 22 of the geo-containment system 1 is configured to determine a soft boundary 44 and a warning boundary 46. The soft boundary 44 is spaced apart from hard boundary 38 by a distance D1, and the warning boundary 46 is spaced apart from the hard boundary 38 by a distance D2. The distance D1 may correspond to a minimum safe distance that is determined by the boundary violation prediction and detection component 22 of the onboard enforcement system 10 utilizing vehicle dynamics coefficients 34 and positional data and velocity of the unmanned vehicle 2, as determined by the alternative PNT system 14 and/or the GPS primary PNT system 16. The minimum safe distance D1 preferably changes dynamically, i.e., as a maximum distance the unmanned vehicle 2 could travel if a contingency were triggered. As such, for UAV embodiments, this parameter is driven by the aerodynamic parameters of the vehicle combined with dynamics information such as the altitude, speed, and in some cases, attitude. The distance D2 may be greater than the distance D1. The distance D2 may be calculated by the enforcement system 10 onboard by multiplying the distance D1. For example, the distance D2 may be 1.25 times the distance D1. The boundary violation prediction and detection component 22 of the geo-containment system 1 may also determine soft boundaries 44A and 44B and warning boundaries 46A and 46B for stay-out regions 42A and 42B. Although hard boundaries (e.g., the hard boundaries 38, 38A, and 38B) may be determined prior to travel of the unmanned vehicle 2 utilizing the boundary points 32, the locations of the soft boundary 44 and warning boundary 46 corresponding to distances D1 and D2, respectively, may be calculated onboard during travel by the boundary violation prediction and detection component 22. The distances D1 and D2 may be calculated and updated at a high frequency (e.g., 100 or 1000 times or more per second). Calculation of distance D1 may thus involve the onboard boundary violation prediction and detection component 22 using vehicle dynamics coefficients 34 and position and velocity of the unmanned vehicle 2 as determined by the alternative PNT system 14 and/or the GPS system of the primary PNT system 16. For clarity, the collection and use of such coefficients and measures are enabled by the positioning of enforcement system 10 onboard unmanned vehicle 2, including violation prediction and detection component 22, alternative PNT system 14, and primary PNT system 16. Specifically, it enables achieving high levels of reliability without the loss of integrity that can occur with wireless data links. For clarity, all computations are done onboard unmanned vehicle 2 except for loading in the initial conformance parameters (e.g., the geofence boundaries.) This approach is illustrated, for example, in the embodiments shown in FIG. 1.

Figure 3:
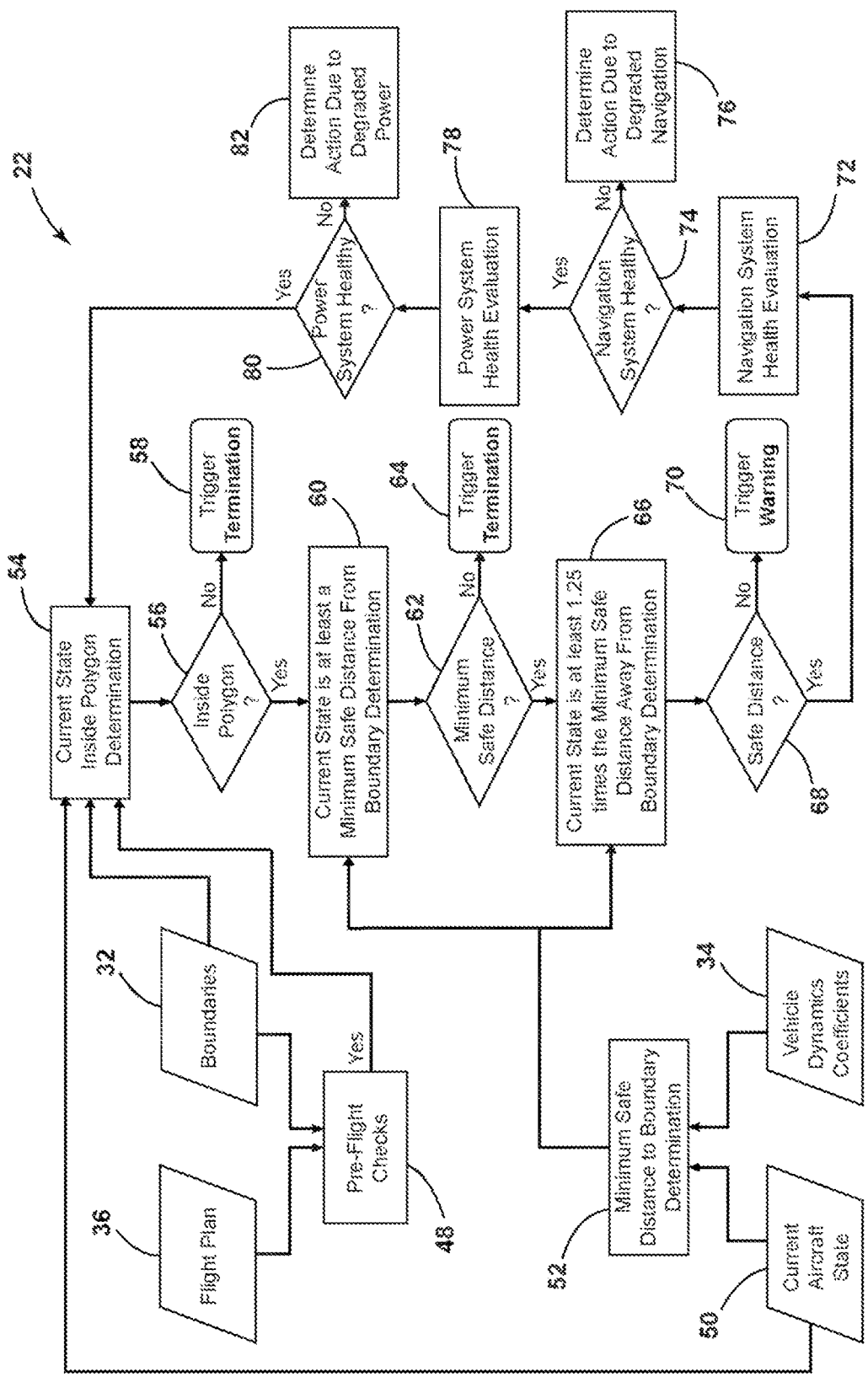
FIG. 3 is a diagram showing detection logic for stay-in regions.
Figure 4:
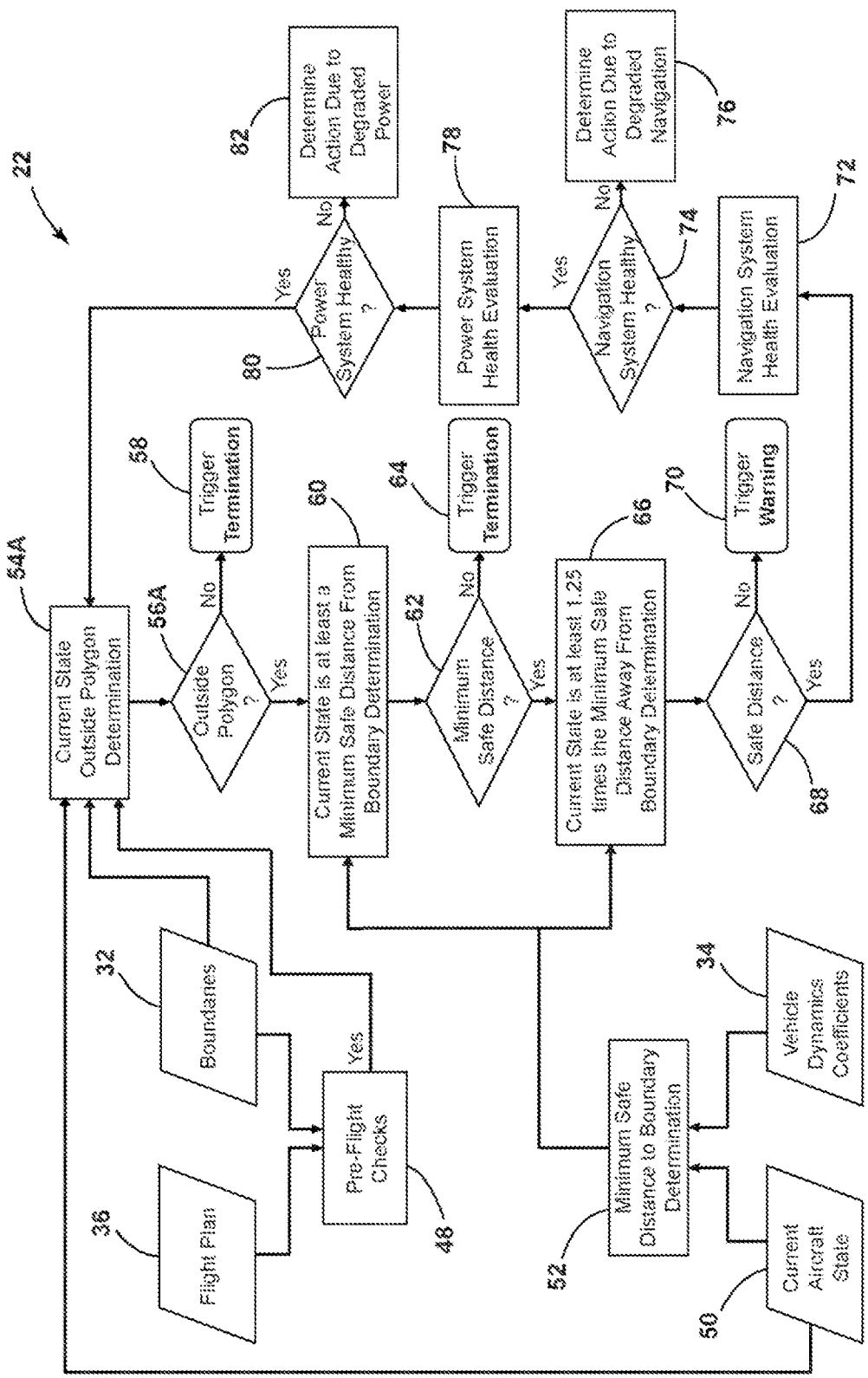
FIG. 4 is a diagram showing detection logic for stay-out regions.

FIG. 3 shows example boundary violation prediction and detection logic for stay-in regions (e.g., the stay-in region 40) during operation of the geo-containment system 1. FIG. 4 shows example boundary violation prediction and detection logic for stay-out regions. In general, steps 32, 34, 36, 48, 50, and 52 may involve some input from a user of base station 4. However, the remainder of steps involve iterations of enforcement system 10 and the operation of other onboard elements before and during travel of unmanned vehicle 2. The operating logic of FIGS. 3 and 4 may be implemented utilizing the boundary violation prediction and detection component 22. The logic diagrams of FIGS. 3 and 4 are exemplary and are not limited to specific sequences or steps. For example, the logic diagrams of FIGS. 3 and 4 are examples of logic with respect to aircraft; however, similar logic may be implemented with respect to ground vehicles and/or marine vehicles.

Referring to FIG. 3, data regarding the travel plan 36 and the boundary points 32 may be input into pre-travel checks 48. The pre-travel checks 48 may include evaluating the travel plan 36 to determine if the travel plan will violate a boundary. The vehicle dynamics coefficients 34 and current vehicle state 50 are utilized in a minimum safe distance to boundary determination 52. The minimum safe distance to boundary is shown schematically as the distance D1 in FIG. 2. Step 54 represents a determination if the unmanned vehicle 2 is presently inside a polygon (e.g., the hard boundary 38). At steps 56 and 58, if the unmanned vehicle 2 is not inside the polygon (e.g., the hard boundary 38), the system may trigger termination as shown at step 58. Termination may comprise onboard vehicle control system 1306 to respond (see FIG. 13) by shutting down the propulsion system 12 (e.g., an engine of a car, a turbine of a plane) or other action to stop the travel of the unmanned vehicle 2. Although termination preferably involves eliminating all travel potential (e.g., thrust) from the propulsion system 12, termination may also comprise reducing speed and/or maneuvering the unmanned vehicle 2 so it stops (e.g., lands) with minimal additional travel.

If the unmanned vehicle 2 is determined to be inside the polygon and/or hard boundary 38 at step 56, the system may then determine if the current state is at least a minimum safe distance D1 from a hard boundary at steps 60 and 62. Such steps may be equivalent to determining if the vehicle has crossed (and thereby violated) the soft boundary 44 (e.g., as shown in FIG. 2). If the unmanned vehicle 2 is at a distance that is less than the minimum safe distance, the enforcement system 10 issues a signal or trigger, which ultimately initiates termination as shown at step 64. As discussed above, termination may include reducing or eliminating the travel potential of propulsion system 12 (e.g., by disabling an engine, reducing fuel flow to the propulsion system 12, or the like via the response of onboard vehicle control system 1306 to the trigger).

As shown at steps 66 and 68, the system may also determine if the current state is at least a predetermined or assured amount (e.g., 1.25 times) of the minimum safe distance away from the boundary determination. These steps may be equivalent to determining if the unmanned vehicle 2 has crossed (and has thereby violated) the warning boundary 46. If the unmanned vehicle 2 has crossed the warning boundary 46, the system may issue a trigger warning as shown at 70. The warning 70 may comprise an audio or visual warning to a user (e.g., via the graphical user interface 30 and/or speakers of the base station 4). The warning 70 may also include or trigger a travel maneuver by an auto pilot system of the unmanned vehicle 2. The travel maneuver may be a maneuver that, if possible, changes a travel path of the unmanned vehicle 2 to avoid crossing soft boundary 44, and also avoids hard boundary 38. If the travel maneuver fails to avoid crossing the soft boundary 44, termination may be triggered, as shown at step 64.

As shown at steps 72, 74, and 76, if the unmanned vehicle 2 is at a safe distance (step 68), the system may evaluate the health of the navigation system at 72, and may determine an action at step 76 if the navigation system has been degraded. The navigation system health evaluation is discussed in more detail below in connection with FIG. 5.

As shown at steps 78, 80, and 82, the system also evaluates/monitors the health of the power system 9 of the vehicle and, if the power system 9 has degraded, takes action at step 82. Such power system monitoring is discussed in more detail below in connection with FIG. 6.

The operating logic of FIG. 4 for stay-out regions is substantially similar to the operating logic for stay-in regions (e.g., the example shown in FIG. 3); however, at steps 54A and 56A, the system may determine if the vehicle is outside of the polygon, rather than determining if the system is inside the polygon as shown at steps 54 and 56 of FIG. 3. The operating logic of FIGS. 3 and 4 may be utilized simultaneously to control unmanned vehicle 2 if the unmanned vehicle 2 is operating in a region that includes both stay-in regions and stay-out regions as shown in FIG. 2.

Figure 4A:
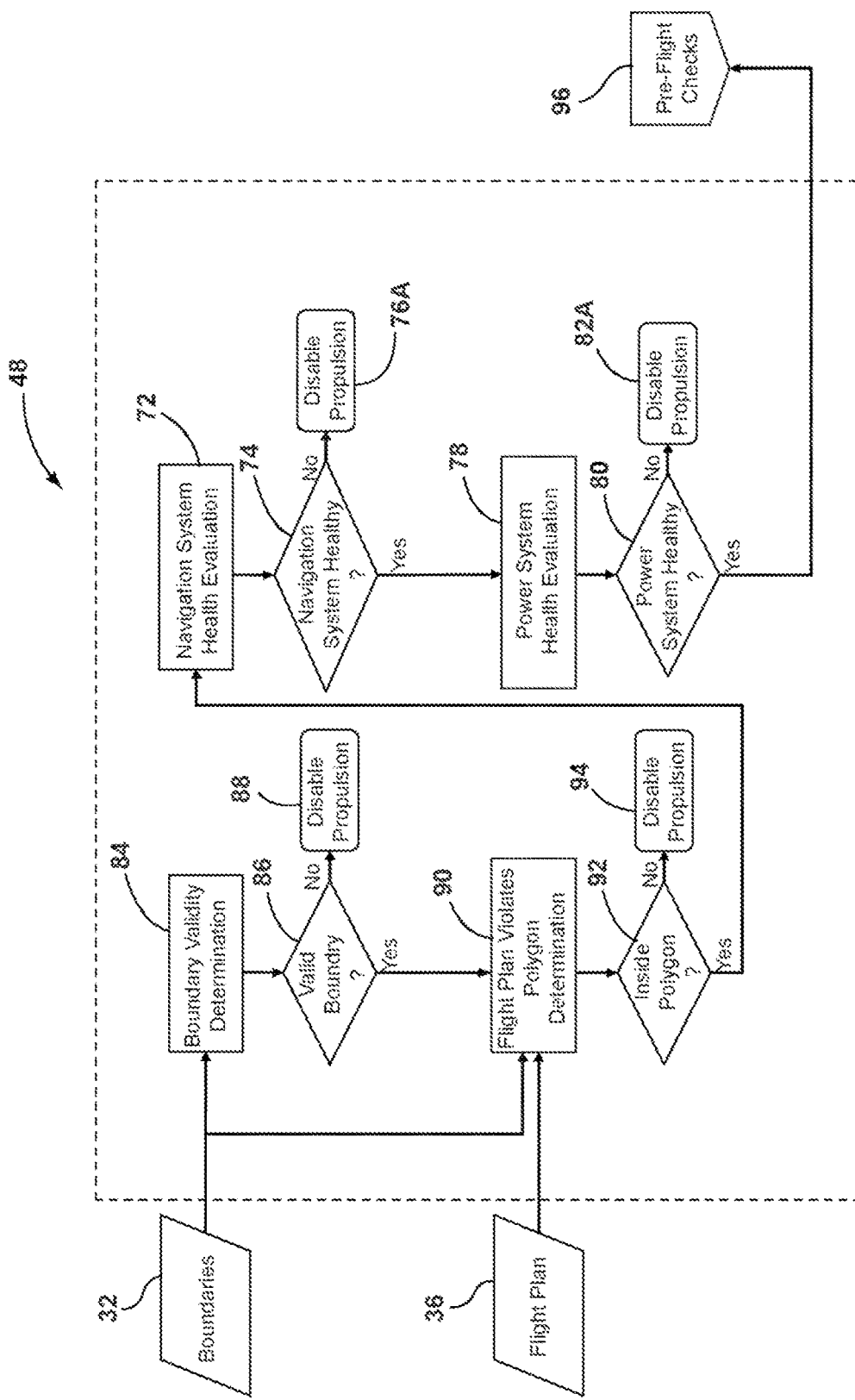
FIG. 4A is a diagram showing boundary violation prediction and detection logic for pre-travel checks.

With further reference to FIG. 4A, the pre-travel check 48 may use the boundary points 32 to determine if a valid boundary has been entered as shown at 84 and 86. If the boundary is not valid (e.g., if edges of the boundary cross each other and/or have very sharp corners), propulsion may be disabled as shown at 88. One or more of the following criteria may be utilized to determine if a boundary (e.g., a polygon) is valid:

(1) The vertices of the polygon region may be in counter-clockwise order;
(2) Two non-adjacent boundary edges of the polygon region may avoid crossing each other or may be further than a first predefined minimum distance;
(3) For two adjacent boundary edges, their respective non-shared endpoints may be greater than a second predefined minimum distance from the other edge;
(4) Two adjacent boundary edges of the polygon region may form sufficiently non-sharp corners (e.g., may form corners greater than 3 degrees); and/or
(5) Boundary edge may be greater than a predefined minimum length (e.g., 1.0 meter or 0.1 meter).

As shown at steps 90 and 92, the boundary points 32 and travel plan 36 may also be evaluated to determine if the travel plan violates a polygon (e.g., the hard boundary 38). The travel plan evaluation logic is discussed in more detail below in connection with FIGS. 10A-10C. If the travel plan does not remain inside a boundary polygon, the system disables propulsion as shown at step 94.

If the vehicle will stay inside a polygon at step 92 (or outside a polygon if the boundary points 32 include a stay-out region), the pre-travel checks may then proceed to evaluate the navigation system health as shown at 72 and 74. The propulsion system may be disabled at 76A if the navigation system is not healthy (e.g., is not operating properly). Such disabling may be accomplished by either comparing the independent positioning sources to verify that they agree within an acceptable threshold or by estimating the errors present within the position solutions and verifying that they are below an acceptable threshold. The system may then assesses the power system at steps 78 and 80, and may disable propulsion at step 82A if the power system is not functioning properly. Evaluation of the health of the power system is discussed in more detail below in connection with FIGS. 12A-12D. The output 96 of the pre-travel checks may comprise disabling propulsion or allowing propulsion. The output 96 may further comprise an audio and/or visual signal to the operator utilizing the graphical user interface 30. For example, if the pre-travel checks 48 do not detect a problem, the graphical user interface 30 may provide a message indicating that the pre-travel checks have not revealed a problem, and that the unmanned vehicle 2 may proceed; however, a warning signal may also be provided if the pre-travel checks indicate a problem to alert a user concerning the nature of the problem. For example, the graphical user interface 30 may display a message indicating that the travel path will violate a boundary, that the navigation system is not operating properly, and/or that the electrical power system of the unmanned vehicle 2 is not operating properly.

Figure 10A:
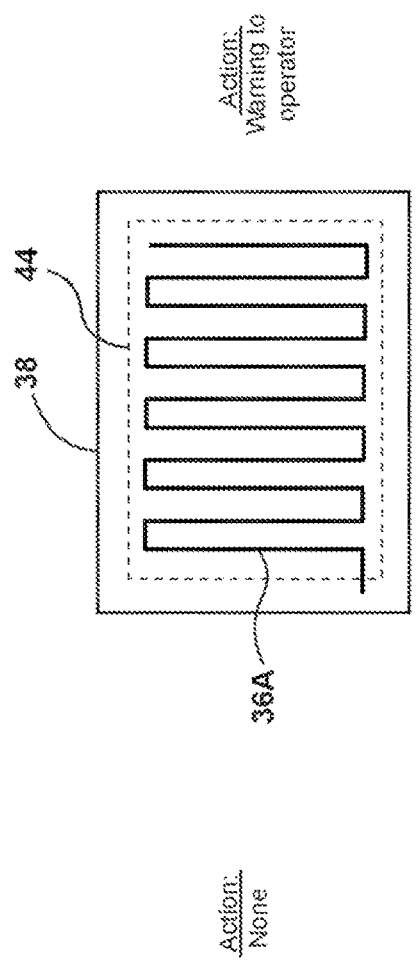
FIG. 10A is a schematic plan view showing pre-travel travel plan evaluation logic for normal operation.
Figure 10B:
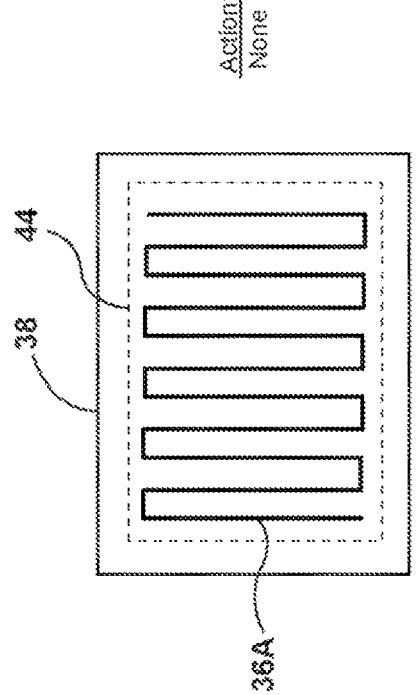
FIG. 10B is a schematic plan view showing pre-travel travel plan evaluation logic with travel plan warning.
Figure 10C:
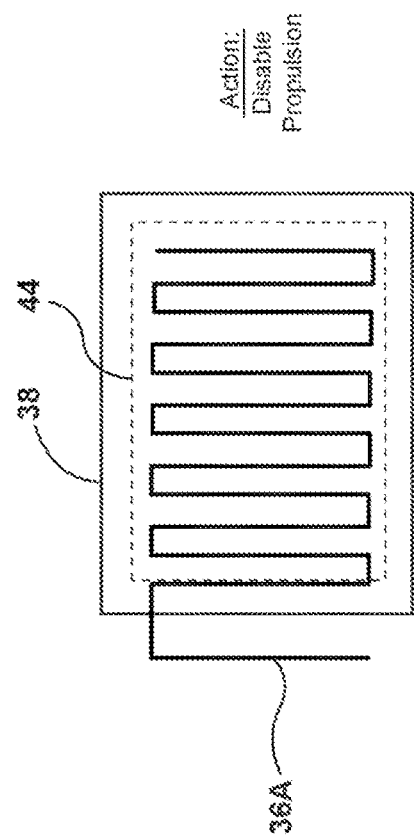
FIG. 10C is a schematic plan view showing pre-travel travel plan evaluation logic in which the travel plan is invalid.

Evaluation of various travel paths is shown schematically in FIGS. 10A-10C. With reference to FIG. 10A, if a travel plan 36A is within hard boundary 38 and soft boundary 44, the system need not take any action. The travel plan 36A of FIG. 10A may generally correspond to an affirmative determination at step 92 of FIG. 4A.

FIG. 10B is a schematic plan view showing pre-travel travel plan evaluation logic with travel plan warning. If a travel path 36B crosses soft boundary 44, but does not cross hard boundary 38, the system may cause output of a warning to the operator. The warning may comprise a message that is displayed on graphical user interface 30, and/or may comprise any other suitable warning to the operator. The determination of FIG. 10B may be implemented utilizing a second determination that is similar to the "inside polygon?" determination at step 92 and following an affirmative determination at step 92, which may include warning an operator if soft boundary 44 is violated, but still proceeding to the navigation system health evaluation at step 72.

FIG. 10C is a schematic plan view showing pre-travel travel plan evaluation logic in which the travel plan is invalid. If a travel path 36C crosses both hard boundary 38 and soft boundary 44, the geo-containment system 1 may determine that an invalid travel plan has been entered, and the geo-containment system 1 may disable propulsion. FIG. 10C may correspond to the steps 92 and 94 of FIG. 4A.

FIG. 5 is a diagram showing operating logic for navigation system monitoring. If the navigation systems (e.g., the alternative PNT system 14 and/or the (GPS) primary PNT system 16) are not operating properly at step 74 (e.g., as described with respect to FIGS. 3 and 4), at step 76, the boundary violation prediction and detection component 22 may determine what action to take. At step 98, the boundary violation prediction and detection component 22 may determine if a navigation sensor has been lost. If not, the boundary violation prediction and detection component 22 may determine at step 100 if both navigation sensors (e.g., alternative PNT system 14 and (GPS) primary PNT system 16) indicate a safe state. If so, the system may trigger a warning at step 102. If not, the boundary violation prediction and detection component 22 may trigger termination at step 104. The warning at step 102 may comprise a message displayed on graphical user interface 30, and the termination at step 104 may comprise halting all thrust from propulsion system 12. If, at step 98, it is determined that all or portions of the navigation sensors (e.g., alternative PNT system 14 and primary PNT system 16) have been lost, the boundary violation prediction and detection component 22 may determine if a functioning navigation system (e.g., alternative PNT system 14 and/or primary PNT system 16) indicate a safe state. If so, a warning trigger may be issued as shown at 108. Otherwise, it may issue a trigger for termination as shown at 110. The warning 108 may be substantially the same as the warning at step 102, and termination 110 may be substantially the same as the termination at step 104.

With further reference to FIG. 6, at step 80 (see also FIGS. 3 and 4), the system may determine if the power system 9 is operating properly. If not, at step 112, the boundary violation prediction and detection component 22 may determine if the power system is fully compromised. If so, the boundary violation prediction and detection component 22 may trigger termination at step 112. If not, the boundary violation prediction and detection component 22 may trigger a warning at step 114.

FIG. 12A is a graph showing power system evaluation logic for normal operation. If the power system 9 is determined to be healthy (e.g., if it is operating within a safe voltage range), the boundary violation prediction and detection component 22 need not take any action. As such, FIG. 12A may correspond to a normal operation of the unmanned vehicle 2.

Figure 11A:
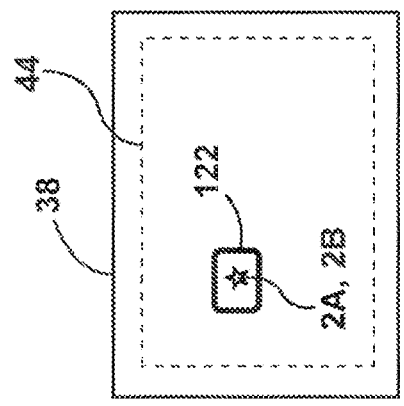
FIG. 11A is a schematic plan view showing navigation system evaluation logic for normal operation.
Figure 11B:
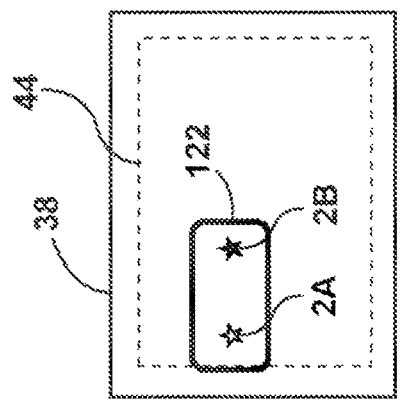
FIG. 11B is a schematic plan view showing navigation system evaluation logic in which there is a loss of one navigation system.

FIG. 11B is a schematic plan view showing navigation system evaluation logic in which there is a loss of one navigation system. If the voltage level Vis in a range that is below the lowest safe voltage but above the highest unsafe voltage, the boundary violation prediction and detection component 22 may execute a contingency maneuver. The contingency maneuver of FIG. 12B may correspond to the warning at step 114 of FIG. 6. The contingency maneuver may, for example, involve issuing a trigger for reducing thrust of propulsion system 12 and causing the unmanned vehicle 2 to stop and/or land. This maneuver may be executed by auto pilot 7 of the unmanned vehicle 2, in conjunction with the onboard vehicle control system 1306.

Figure 11C:
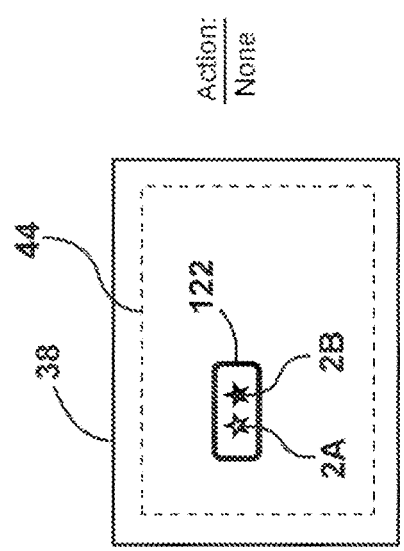
FIG. 11C is a schematic plan view showing navigation system evaluation logic in which an unacceptable but safe position discrepancy is detected.
Figure 11D:
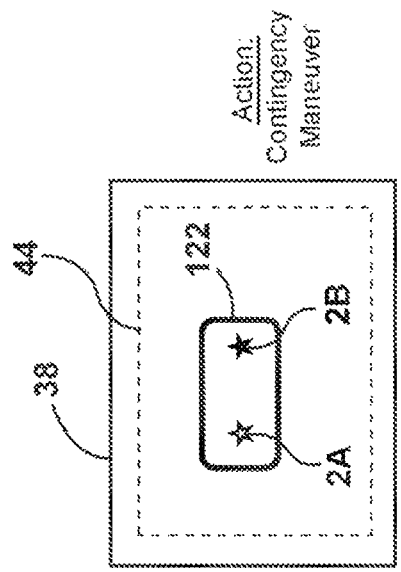
FIG. 11D is a schematic plan view showing navigation system evaluation logic in which an unacceptable and unsafe position discrepancy is detected.

FIG. 11C is a schematic plan view showing navigation system evaluation logic in which an unacceptable but safe position discrepancy is detected. FIG. 11D is a schematic plan view showing navigation system evaluation logic in which an unacceptable and unsafe position discrepancy is detected. If the voltage V is unsafe because it is either too low (FIG. 12C) or too high (FIG. 12D), the boundary violation prediction and detection component 22 may terminate operation of the unmanned vehicle 2. Termination may involve preventing propulsion system 12 from producing any thrust. The safe and unsafe voltage criteria may be different for different unmanned vehicles, and such criteria are not limited to any specific range of voltages.

Figure 7A:
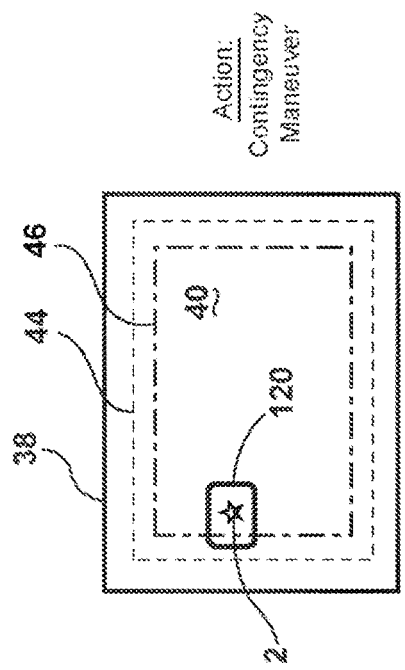
FIG. 7A is a schematic plan view showing lateral boundary evaluation logic for stay-in regions in which an error ellipse is defined around an unmanned vehicle that is inside all boundaries.
Figure 7B:
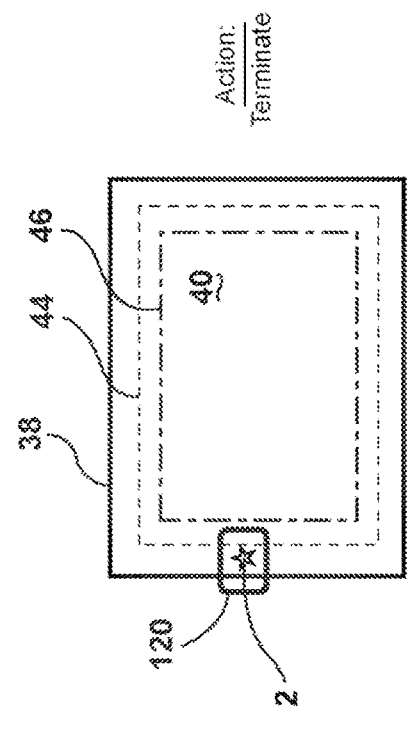
FIG. 7B is a schematic plan view showing lateral boundary evaluation logic for stay-in regions in which the error ellipse has breached a warning boundary.
Figure 7C:
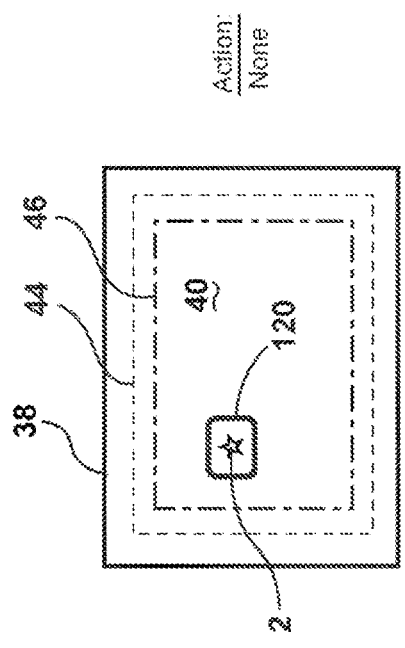
FIG. 7C is a schematic plan view showing lateral boundary evaluation logic for stay-in regions in which the error ellipse has breached a soft boundary.
Figure 7D:
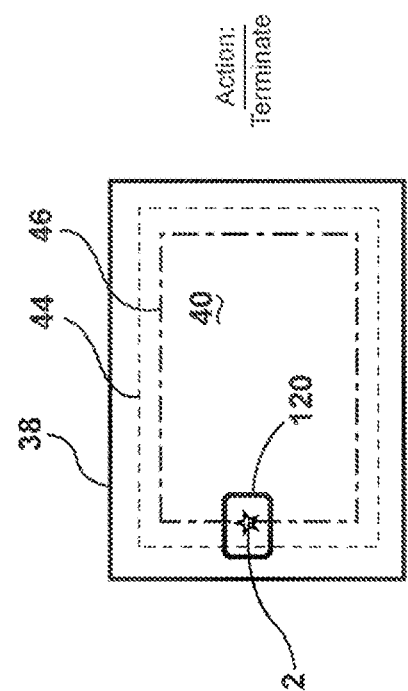
FIG. 7D is a schematic plan view showing lateral boundary evaluation logic for stay-in regions in which the error ellipse has breached a hard boundary.
Figure 8A:
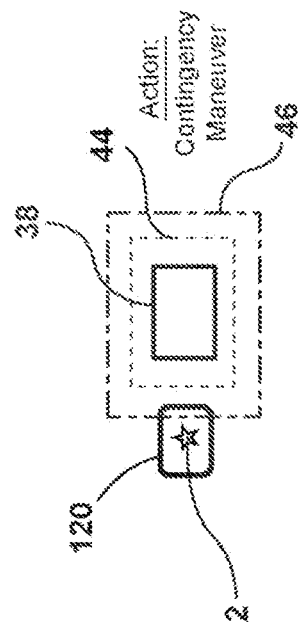
FIG. 8A is a schematic plan view showing lateral boundary evaluation logic for stay-out regions in which an error ellipse defined around an unmanned vehicles is outside all boundaries.
Figure 8B:
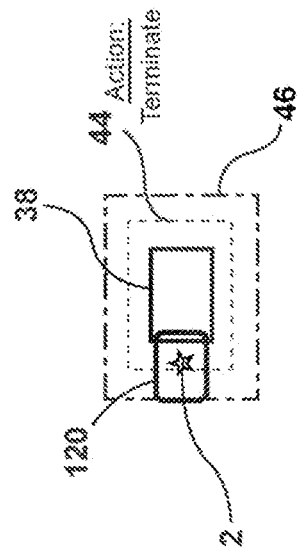
FIG. 8B is a schematic plan view showing lateral boundary evaluation logic for stay-out regions in which the error ellipse has breached a warning boundary.
Figure 8C:
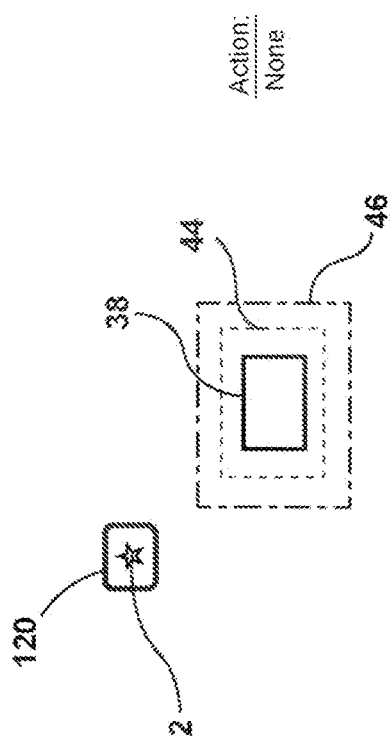
FIG. 8C is a schematic plan view showing lateral boundary evaluation logic for stay-out regions in which the error ellipse has breached a soft boundary.
Figure 8D:
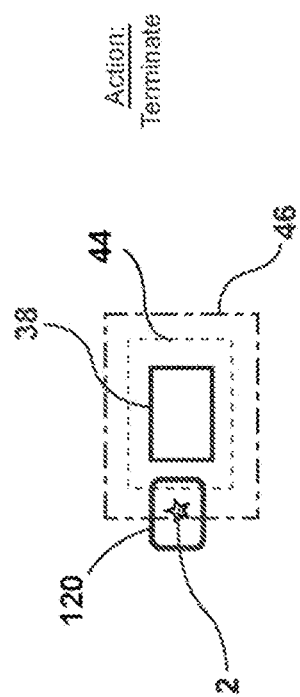
FIG. 8D is a schematic plan view showing lateral boundary evaluation logic for stay-out regions in which the error ellipse has breached a hard boundary.
Figure 9A:
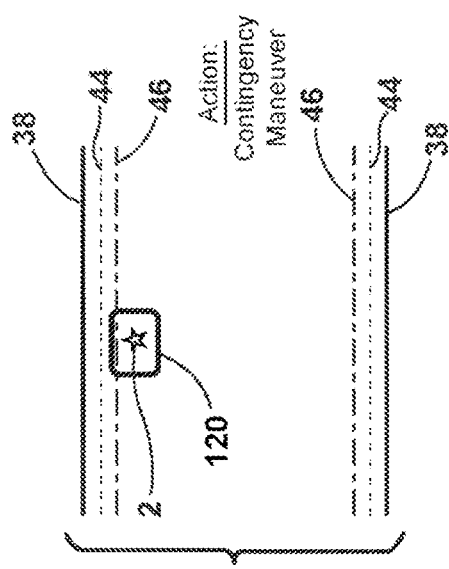
FIG. 9A is a schematic view showing vertical boundary evaluation logic in which an error ellipse around a position of an unmanned vehicle is inside of all boundaries.
Figure 9B:
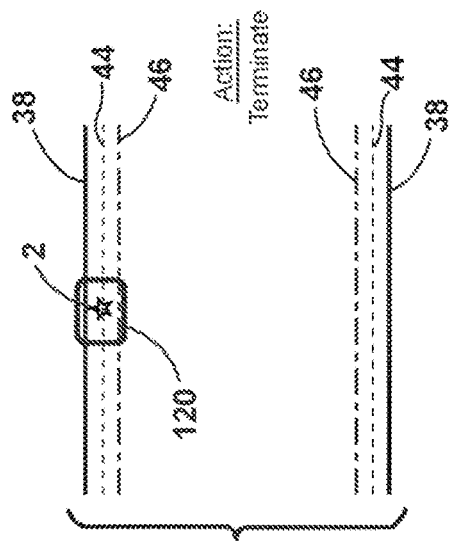
FIG. 9B is a schematic view showing vertical boundary evaluation logic in which the error ellipse has breached a warning boundary.
Figure 9C:
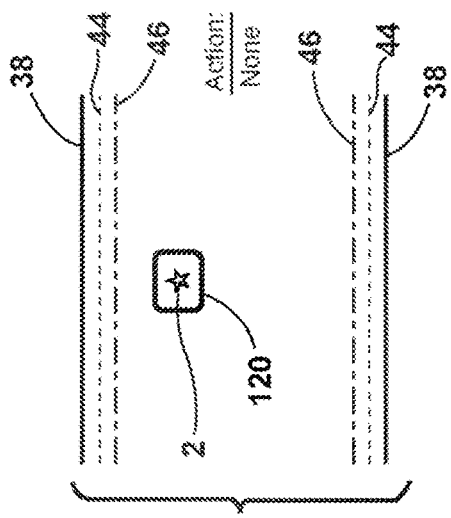
FIG. 9C is a schematic view showing vertical boundary evaluation logic in which the error ellipse has breached a soft boundary.
Figure 9D:
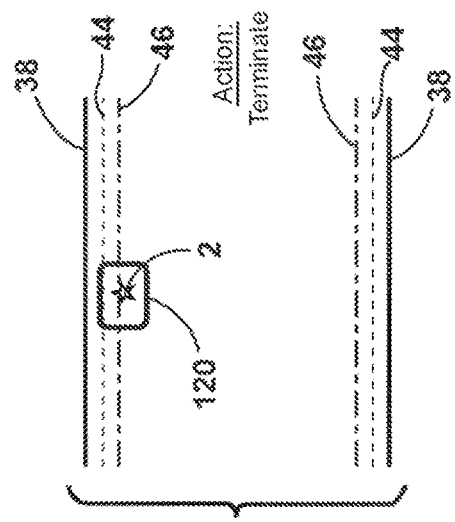
FIG. 9D is a schematic view showing vertical boundary evaluation logic in which the error ellipse has breached a hard boundary.

FIG. 7A is a schematic plan view showing lateral boundary evaluation logic for stay-in regions in which an error ellipse is defined around an unmanned vehicle that is inside all boundaries. FIG. 7B is a schematic plan view showing lateral boundary evaluation logic for stay-in regions in which the error ellipse has breached a warning boundary. FIG. 7C is a schematic plan view showing lateral boundary evaluation logic for stay-in regions in which the error ellipse has breached a soft boundary. FIG. 7D is a schematic plan view showing lateral boundary evaluation logic for stay-in regions in which the error ellipse has breached a hard boundary. The navigation sensors (e.g., the alternative PNT system 14 and primary PNT system 16) may have uncertainty (e.g., error) associated with respect to the accuracy of the position of the unmanned vehicle 2. For example, with GPS the error may be established using Dilution of Precision (DOP) calculation, such that a lower DOP value represents lower error and greater reliability or higher quality of positional data. This uncertainty is shown in FIGS. 7A-7D as an error ellipse 120 or region around the unmanned vehicle 2. The error ellipse 120 may be a three dimensional or two dimensional region about the unmanned vehicle 2 having a size and shape defined by the uncertainty of the unmanned vehicle 2. Thus, the uncertainty may be a function of reliability or quality of the positional data of one or both of alternative PNT system 14 and primary PNT system 16. The shape of the error ellipse 120 need not be an ellipse, and may be any shape appropriate to the application and vehicle. The lateral boundary evaluation logic for stay-in regions 40 takes into account the error ellipse 120. More specifically, as shown in FIG. 7A, if the error ellipse 120 is inside all boundaries (e.g., including the warning boundary 46), no action need be taken. However, if the error ellipse crosses warning boundary 46 as shown in FIG. 7B, the boundary violation prediction and detection component 22 may execute a contingency maneuver. For example, the boundary violation prediction and detection component 22 may cause the auto pilot 7 to stop the unmanned vehicle 2 by turning off power to one or more engines. If positional data shows the error ellipse 120 crosses the soft boundary 44 (FIG. 7C) or the hard boundary 38 (FIG. 7D), the boundary violation prediction and detection component 22 may terminate operation of the unmanned vehicle 2. Termination may comprise stopping all thrust of propulsion system 12. The boundary violation prediction and detection component 22 may terminate operation when the error ellipse 120 crosses the soft boundary 44 (FIG. 7C), such that the unmanned vehicle 2 does not reach the position of FIG. 7D in which error ellipse 120 crosses hard boundary 38. The boundary violation prediction and detection component 22 may further be configured to terminate operation if the error ellipse 120 does cross hard boundary 38, as shown in FIG. 7D.

The lateral boundary evaluation logic for stay-out regions is shown in FIGS. 8A-8D. The logic operation of FIGS. 8A-8D may correspond to the operating logic for the stay-in regions of FIGS. 7A-7D, respectively. When positional data shows the error ellipse 120 is outside of all boundaries (FIG. 8A) the boundary violation prediction and detection component 22 need not take any action, and the unmanned vehicle 2 may continue to operate in a normal manner. If the error ellipse 120 crosses warning boundary 46 (FIG. 8B), the boundary violation prediction and detection component 22 may cause the auto pilot 7 to execute a contingency maneuver. If the error ellipse 120 crosses the soft boundary 44 (FIG. 8C) or the hard boundary 38 (FIG. 8D), the boundary violation prediction and detection component 22 terminates operation of unmanned vehicle 2.

The boundary evaluation logic for vertical boundaries is shown in FIGS. 9A-9D. If the error ellipse 120 is inside all boundaries (FIG. 9A), the boundary violation prediction and detection component 22 need not take any action, and the unmanned vehicle 2 may continue to operate in a normal manner. If the error ellipse 120 crosses warning boundary 46, the boundary violation prediction and detection component 22 may execute a contingency maneuver (e.g., the auto pilot 7 may cause the unmanned vehicle 2 to stop). If the error ellipse 120 crosses the soft boundary 44 (FIG. 9C) or a hard boundary 38 (FIG. 9D), the boundary violation prediction and detection component 22 may terminate operation by shutting off all thrust of propulsion system 12. As shown in FIGS. 9A-9D, both upper and lower boundaries may be entered to limit vertical travel of the unmanned vehicle 2 in both upward and downward directions. An upper boundary, a lower boundary, or both may be entered, depending upon the circumstances (e.g., restrictions) present in the area in which the unmanned vehicle 2 is being operated.

FIGS. 11A-11D are schematic plan views showing navigation system evaluation logic. The alternative PNT system 14 may provide a first vehicle location 2A, and the primary PNT system 16 may provide a second vehicle location 2B that is not exactly the same as the first vehicle location 2A. The first vehicle location 2A and the second vehicle location 2B may be associated with error boundaries that, when combined, may produce an error ellipse 122. FIG. 11A is a schematic plan view showing navigation system evaluation logic for normal operation. During normal operation, the error ellipse 122 may be within all boundaries (e.g., the soft boundary 44 and the hard boundary 38), and the boundary violation prediction and detection component 22 need not take any action, such that the unmanned vehicle 2 may operate in its normal manner.

FIG. 11B is a schematic plan view showing navigation system evaluation logic in which there is a loss of one navigation system. If one of the navigation systems (e.g., the alternative PNT system 14 and/or the GPS system 16) is lost such that the first vehicle location 2A and/or the second vehicle location 2B is available, the boundary violation prediction and detection component 22 may cause the auto pilot 7 to execute a contingency maneuver. The contingency maneuver may comprise stopping the unmanned vehicle 2.

FIG. 11C is a schematic plan view showing navigation system evaluation logic in which an unacceptable but safe position discrepancy is detected. If the first vehicle location 2A and the second vehicle location 2B provided by the navigation systems (e.g., the alternative PNT system 14 and/or the GPS system 16), respectively, show an unacceptably high discrepancy, and if the combined error ellipse 122 is within both soft boundary 44 and hard boundary 38, the boundary violation prediction and detection component 22 may cause the auto pilot 7 to execute a contingency maneuver (e.g., stopping the unmanned vehicle 2).

FIG. 11D is a schematic plan view showing navigation system evaluation logic in which an unacceptable and unsafe position discrepancy is detected. If the navigation systems (e.g., the alternative PNT system 14 and/or the GPS system 16) produce an unacceptable discrepancy between the first vehicle location 2A and the second vehicle location 2B, and if the combined error ellipse 122 crosses the soft boundary 44 (and/or the hard boundary 38), the boundary violation prediction and detection component 22 may cause the auto pilot 7 to terminate travel by eliminating all power from propulsion system 12.

Figure 13:
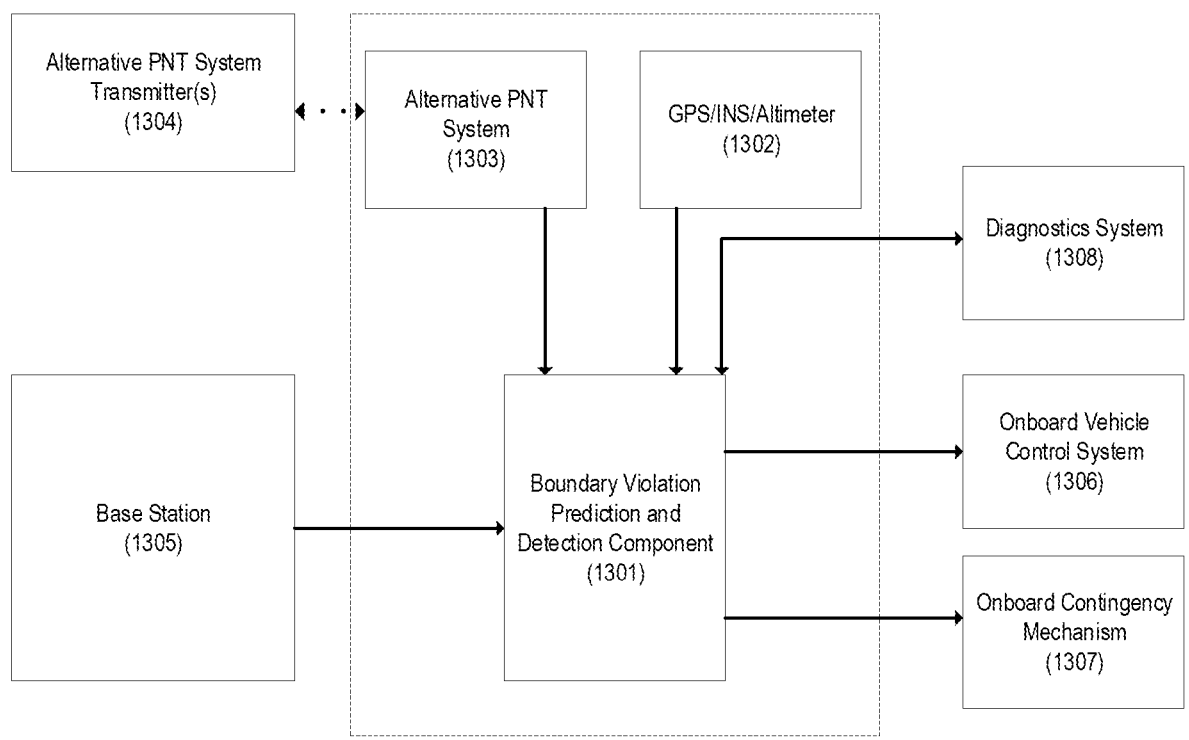
FIG. 13 shows a boundary violation prediction and detection system which may be implemented in a vehicle.

FIG. 13 shows a boundary violation prediction and detection component 1301 (i.e., corresponding to embodiments of the boundary violation prediction and detection component 22 described above), which may be communicatively coupled to a primary PNT system 1302 (which may be, e.g., a GPS, INS, altimeter, or the like) and an alternative PNT system 1303. FIG. 13 is in many respects similar to FIG. 1 and depicts an embodiment of geo-containment system 1. The boundary violation prediction and detection component 1301 may further be communicatively coupled to a base station 1305, an onboard contingency mechanism 1307, an onboard vehicle control system 1306, and a diagnostics system 1308. The alternative PNT system 1303 may be communicatively coupled to alternative PNT system transmitters 1304 (which may be the same or similar as the Alternative PNT System Transmitters 6). For clarity, the onboard vehicle control system 1306 is directed to avionics functionality in response to triggers from enforcement system 10; it does not correspond to enforcement system 10.

The alternative PNT system 1303, primary PNT system 1302, and the boundary violation prediction and detection component 1301 as a system are depicted in FIG. 13, and may be configured to be lightweight for onboard placement and to receive power from an independent power source. In that way, cessation of power to the vehicle (e.g., where a battery runs out of power) does not result in cessation of operations of the boundary violation prediction and detection component 1301. Similarly, the components depicted in FIG. 13 may be designed and/or shielded to protect against conditions that harm performance, e.g., electromagnetic interference.

The boundary violation prediction and detection component 1301 may be the same as or similar to the boundary violation prediction and detection component 22 and preferably may, e.g., be implemented on one or more computing devices onboard or inside of a vehicle (e.g., an airplane, car, or the like) for inter-relation with sensors and other onboard systems. The boundary violation prediction and detection component 1301 may comprise processors and memory which, when executed by the one or more processors, cause steps including, for example, receiving data from the base station 1305 or issuing trigger signals to onboard vehicle control system 1306.

The primary PNT system 1302 and the alternative PNT system 1303 (which may be the same or similar to the primary PNT system 16 and/or the alternative PNT system 14), and preferably may be configured onboard to transmit positional data corresponding to a vehicle to the boundary violation prediction and detection component 1301. For example, the alternative PNT system 1303 may transmit a first set of positional data values (e.g., an x, y, and z value of a vehicle) to the boundary violation prediction and detection component 1301, whereas the primary PNT system 1302 may be configured to transmit a different, potentially broader set of positional data values (e.g., rotational information about the vehicle, yaw information about the vehicle) to the boundary violation prediction and detection component 1301. Data transmitted by the alternative PNT system 1303 need not be GPS based (i.e., preferably is an alternative form of information for reliability), and may be received in whole or in part from the alternative PNT system transmitters 1304. The positional data may be based on the type of vehicle. For example, altitude information about a ground-based vehicle (e.g., a car) need not be collected and transmitted to the boundary violation prediction and detection component 1301; however, altitude information about an air-based vehicle (e.g., an airplane) may be collected onboard and transmitted or made available to the onboard boundary violation prediction and detection component 1301.

The base station 1305, which may be similar to the base station 4, may have a graphical user interface and/or input devices which enable one or more users to transmit data such as, e.g., transmit boundary points, vehicle dynamics coefficients, and/or route plans to the boundary violation prediction and detection component 1301. The base station 1305 need not be located in and/or around the vehicle, and the transmission of such data may be performed over a wireless network, asynchronously with any motion of the vehicle, and/or the like. In particular, data receive from the base station 1305 may be received before the vehicle begins travel. For example, a user may use the base station 4 to input data relating to roads which may and/or may not be driven by an automobile, a region which a boat is prohibited from entering, or the like, and before the vehicle begins to move.

The boundary violation prediction and detection component 1301 may be configured to, based on the data from the base station 1305, the alternative PNT system 1303, and/or the primary PNT system 1302, transmit instructions or signals to the diagnostics system 1308, the onboard vehicle control system 1306, and/or the onboard contingency mechanism 1307. The diagnostics system 1308 may be configured to receive diagnostic messages from the boundary violation prediction and detection component 1301 and, e.g., display them for one or more users, such as an occupant of a vehicle. The onboard vehicle control system 1306 may be configured to receive and respond to various information and trigger signals from the boundary violation prediction and detection component 1301 including, but not limited to, information regarding system faults, geospatial warnings (e.g., warnings that a vehicle is approaching a boundary), altitude warnings, travel plan deviation warnings, speed warnings, and the like. Such information or trigger may cause the onboard vehicle control system 1306 to, among other things, respond by causing a change a direction, speed, acceleration, altitude, and/or other operating parameters of the vehicle. Thus, a role of these components in embodiments of enforcement system 10 is to issue triggers that include informing onboard vehicle control system 1306 how to respond to control the vehicle. The onboard contingency mechanism 1307 may be configured to receive termination instructions from the boundary violation prediction and detection component 1301 and, based on such instructions, cause the vehicle to stop, slow down, or otherwise cease operation (e.g., by parking, landing, docking).

In the event that a qualified operator (not shown) is available at a vehicle, the onboard contingency mechanism 1307 need not be implemented. For example, rather than causing the vehicle to stop (e.g., land), the onboard vehicle control system 1306 may instead be disabled, such that the qualified operator may be required to take control of the vehicle using base station 1305, for example. In this way, autopilot operations may cease and responsibility for enforcement of any transgression of restricted areas may be the responsibility of the qualified operator.

A simplified example of how the boundary violation prediction and detection component 1301 may operate is provided herein. The boundary violation prediction and detection component 1301 may receive, from the base station 1305, input regarding designated geospatial boundaries or restricted areas (geospatial areas where vehicle operation is prohibited or should be avoided). Boundaries may be expressed as polygons (e.g., concave or convex polygons), may comprise with altitude limits (e.g., if the vehicle in question is an airplane), and may comprise hard boundaries. Such boundary data may be received prior to operation by the vehicle operator. Data regarding restricted areas, temporary operational restrictions, and other geospatial limitations may originate from regulatory authorities or other approved sources. The boundary violation prediction and detection component 1301 may additionally and/or alternatively receive information regarding vehicle characteristics, such as the vehicle's travel plan, speed limitations, and/or operational constraints. During operation, the boundary violation prediction and detection component 1301 may receive positional data from the primary PNT system 1302 and/or the alternative PNT system 1303. During operation, the boundary violation prediction and detection component 1301 may establish intermediate boundaries or buffer zones with respect to the hard boundaries. The buffer zones may be used to provide a warning of proximity to the hard boundary to allow action to alter the route to avoid operation beyond the hard boundary. Such buffers may be sized using vehicle characteristics and current state information to allow contingency maneuvers. The positional information and the boundaries of the buffer zone and the hard boundaries may be monitored dynamically on an ongoing basis. If the vehicle crosses into a first (warning) buffer zone, a first enforcement warning or trigger may be transmitted to the diagnostics system 1308 and/or the onboard vehicle control system 1306. The timing of the trigger warning may be configured to allow the onboard vehicle control system 1306 and/or a qualified operator to avoid the hard boundary. If the vehicle crosses into a second (termination) buffer zone, a second or additional warning or trigger may be provided to the diagnostics system 1308, the onboard vehicle control system 1306, and/or the onboard contingency mechanism 1307, and such an enforcement trigger or warning may ultimately cause the vehicle to cease operation. For example, if the vehicle appears to continue to travel towards the hard boundary, the onboard vehicle control system 1306 may turn the vehicle around, and/or the onboard contingency mechanism 1307 may disable an engine of the vehicle. Additionally and/or alternatively, if a qualified operator (e.g., a driver) is present in the vehicle, the onboard vehicle control system 1306 may cease operation and the qualified operator may be required to take over operation of the vehicle.

Although examples are described above, features and/or steps of those examples may be combined, divided, omitted, rearranged, revised, and/or augmented in any desired manner. Various alterations, modifications, and improvements will readily occur to those skilled in the art. Such alterations, modifications, and improvements are intended to be part of this description, though not expressly stated herein, and are intended to be within the spirit and scope of the disclosure. Accordingly, the foregoing description is by way of example only, and is not limiting

What is claimed is:

1. A geo-containment system comprising:
an unmanned vehicle having a primary positioning, navigation, and timing (PNT) system and an alternative PNT system;
an enforcement system having a boundary violation prediction and detection component in communication with the primary PNT system and the alternative PNT system, the enforcement system located onboard the unmanned vehicle, the enforcement system configured to limit travel of the unmanned vehicle while the unmanned vehicle is in operation based, at least in part, in predefined geospatial operational boundaries including a primary geospatial operational boundary and at least one secondary geospatial operational boundary, wherein the primary geospatial operational boundary is defined by boundary data received by the enforcement system prior to operation of the unmanned vehicle, wherein the at least one secondary geospatial operational boundary is a minimum distance extending from the primary geospatial operational boundary toward the unmanned vehicle, and wherein the minimum distance is determined by the boundary violation prediction and detection component of the enforcement system during operation of the unmanned vehicle based at least in part on dynamics information of the unmanned vehicle including positional data and velocity as determined by the primary PNT system and the alternative PNT system; and an onboard vehicle control system, in communication with the boundary violation prediction and detection component and responsive to the enforcement system, configured to alter operation of the unmanned vehicle if the unmanned vehicle crosses the at least one secondary geospatial operational boundary, wherein altering operation of the unmanned vehicle comprises causing the unmanned vehicle to move to a position which is at least the minimum distance from the primary geospatial operational boundary.

2. The geo-containment system of claim 1, wherein the onboard vehicle control system is further configured to cause the unmanned vehicle to stop if it reaches a predetermined distance from the primary geospatial operational boundary.

3. The geo-containment system of claim 1, wherein the onboard vehicle control system is further configured to generate a warning if the unmanned vehicle crosses the at least one secondary geospatial operational boundary.

4. The geo-containment system of claim 1, wherein the primary geospatial operational boundary is received by the enforcement system prior to operation of the unmanned vehicle.

5. The geo-containment system of claim 1, wherein the minimum distance is further based on a reliability of the positional data associated with the unmanned vehicle.

6. The geo-containment system of claim 5, wherein the unmanned vehicle is an automobile, and wherein the positional data comprises Global Positioning System (GPS) coordinates from the primary PNT system of the unmanned vehicle.

7. The geo-containment system of claim 5, wherein the unmanned vehicle is an airplane, and wherein the positional data comprises an altitude of the unmanned vehicle.

8. The geo-containment system of claim 5, wherein the minimum distance is further based on a reliability of the positional data by Dilution of Precision (DOP) calculation.

9. A method comprising:
determining by an enforcement system onboard an unmanned vehicle and prior to operation of the unmanned vehicle, a primary geospatial operational boundary, wherein the primary geospatial operational boundary is defined by boundary data received by the enforcement system prior to operation of the unmanned vehicle, and further wherein the unmanned vehicle comprises a primary positioning, navigation, and timing (PNT) system and an alternative PNT system, with the primary PNT system and alternative PNT system in communication with the enforcement system;
determining, by a boundary violation prediction and detection component of the enforcement system and during operation of the unmanned vehicle, at least one secondary geospatial operational boundary, wherein the at least one secondary geospatial operational boundary is a minimum distance extending from the primary geospatial operational boundary toward the unmanned vehicle, and wherein the minimum distance is determined by the enforcement system during operation of the unmanned vehicle based at least in part on dynamics information corresponding to the unmanned vehicle including positional data and velocity as determined by the primary PNT system and the alternative PNT system;
detecting, based on positional data associated with the unmanned vehicle, that the unmanned vehicle has crossed the at least one secondary geospatial operational boundary; and
altering the operation of the unmanned vehicle by causing the unmanned vehicle to move to a position which is at least the minimum distance from the primary geospatial operational boundary, using an onboard vehicle control system in communication with and responsive to the enforcement system, and based on the detecting that the unmanned vehicle has crossed the at least one secondary geospatial operational boundary.

10. The method of claim 9, further comprising:
detecting, based on the positional data, that the unmanned vehicle has reached a predetermined distance from the primary geospatial operational boundary; and
causing the unmanned vehicle to stop.

11. The method of claim 9, further comprising:
generating, based on the detecting that the unmanned vehicle has crossed the at least one secondary geospatial operational boundary, a warning.

12. The method of claim 9, wherein the primary geospatial operational boundary is a polygon.

13. The method of claim 9, wherein the minimum distance is further based on the positional data.

14. The method of claim 9, wherein the unmanned vehicle is an automobile, and wherein the positional data comprises Global Positioning System (GPS) coordinates from the primary PNT system of the unmanned vehicle.

15. The method of claim 9, wherein the unmanned vehicle is an airplane, and wherein the positional data comprises an altitude of the unmanned vehicle.

16. The method of claim 9, wherein the minimum distance is further based on a reliability of the positional data.

17. A computing device in an unmanned vehicle having a primary positioning, navigation, and timing (PNT) system, an alternative PNT system, and an enforcement system with a boundary violation and detection component in communication with the primary PNT system and alternative PNT system, the computing device comprising:
one or more processors, wherein at least one of the one or more processors are within the boundary violation and detection component of the enforcement system onboard the unmanned vehicle, and
memory storing instructions that, when executed by the one or more processors, cause the computing device to:
determine by the enforcement system, prior to operation of the unmanned vehicle, a primary geospatial operational boundary, wherein the primary geospatial operational boundary is defined by boundary data received by the one or more processors prior to operation of the unmanned vehicle;
determine by the boundary violation prediction and detection component, during operation of the unmanned vehicle, at least one secondary geospatial operational boundary, wherein the at least one secondary geospatial operational boundary is a minimum distance extending from the primary geospatial operational boundary toward the unmanned vehicle, and wherein the minimum distance is based at least in part on dynamics information of the unmanned vehicle including positional data and velocity as determined by the primary PNT system and the alternative PNT system;

detect, based on positional data associated with the unmanned vehicle, that the unmanned vehicle has crossed the at least one secondary geospatial operational boundary; and alter the operation of the unmanned vehicle by causing the unmanned vehicle to move to a position which is at least the minimum distance from the primary geospatial operational boundary, using an onboard vehicle control system of the unmanned vehicle that is responsive to the enforcement system, and based on the detecting that the unmanned vehicle has crossed the at least one secondary geospatial operational boundary.

18. The computing device of claim 17, wherein the instructions, when executed by the one or more processors, further cause the computing device to:

detect, based on the positional data, that the unmanned vehicle has reached a predetermined distance from the primary geospatial operational boundary; and cause the unmanned vehicle to stop.

19. The computing device of claim 17, wherein the instructions, when executed by the one or more processors, further cause the computing device to:

generate, based on the detecting that the unmanned vehicle has crossed the at least one secondary geospatial operational boundary, a warning.

20. The computing device of claim 17, wherein the minimum distance is further based on the positional data.

* * * * *